US006892995B2

(12) United States Patent
Tame et al.

(10) Patent No.: US 6,892,995 B2
(45) Date of Patent: May 17, 2005

(54) POSITIVE ENGAGEMENT LATCH

(75) Inventors: Omar D. Tame, West Bloomfield, MI (US); Kirk M. Nicola, Beverly Hills, MI (US); James Weber, West Bloomfield, MI (US); Joseph Severini, Holland Landing (CA)

(73) Assignee: Intier Automotive Inc., Aurora (CA)

( * ) Notice: Subject to any disclaimer, the term of this patent is extended or adjusted under 35 U.S.C. 154(b) by 146 days.

(21) Appl. No.: 09/995,241

(22) Filed: Nov. 26, 2001

(65) Prior Publication Data

US 2002/0079418 A1 Jun. 27, 2002

Related U.S. Application Data

(63) Continuation-in-part of application No. 09/692,836, filed on Oct. 19, 2000, now Pat. No. 6,322,036.

(51) Int. Cl.[7] ................................................ F16M 13/00

(52) U.S. Cl. ....................................................... 248/429

(58) Field of Search ................................ 248/429, 423, 248/424; 296/64, 65.1, 68.1; 297/344.1, 463.1

(56) References Cited

U.S. PATENT DOCUMENTS

| | | | | |
|---|---|---|---|---|
| 4,189,957 A | | 2/1980 | Gedig et al. | |
| 4,556,186 A | | 12/1985 | Langmesser, Jr. et al. | |
| 4,635,890 A | | 1/1987 | Matsuda et al. | |
| 4,712,759 A | | 12/1987 | Sugama et al. | |
| 4,961,559 A | | 10/1990 | Raymor | |
| 5,192,045 A | * | 3/1993 | Yamada et al. | 248/430 |
| 5,286,076 A | | 2/1994 | DeVoss et al. | |
| 5,564,315 A | | 10/1996 | Schuler et al. | |
| 5,596,910 A | | 1/1997 | Bauer et al. | |
| 5,816,110 A | | 10/1998 | Schuler et al. | |
| 5,913,947 A | | 6/1999 | Groche | |
| 5,918,846 A | | 7/1999 | Garrido | |
| 6,086,154 A | | 7/2000 | Mathey et al. | |
| 6,113,051 A | | 9/2000 | Moradell et al. | |
| 6,216,995 B1 | | 4/2001 | Koester | |
| 6,231,022 B1 | | 5/2001 | Becker et al. | |
| 6,354,533 B1 | * | 3/2002 | Jespersen | 242/560.1 |

* cited by examiner

*Primary Examiner*—Leslie A. Braun
*Assistant Examiner*—Kofi Shulterbrandt
(74) *Attorney, Agent, or Firm*—Clark Hill PLC

(57) ABSTRACT

A seat track assembly for adjusting a seat assembly of an automotive vehicle comprising a lower track having a first plurality of apertures, an upper track slidably mounted to the lower track and having a second plurality of apertures. A latch assembly is fixedly mounted to the upper track. The latch assembly includes a plurality of locking fingers projecting through the apertures in the upper track and adapted to be received in at least one of the apertures in the lower track. An actuator moves the fingers between a locked condition engaged with at least one of the apertures in the lower track and an unlocked condition spaced from each of the apertures in the lower track and a biasing member biases the fingers to the locked condition regardless of a relative position between the upper and lower tracks.

9 Claims, 28 Drawing Sheets

24 74 64 78 122 86 68 66 34 68 74 88 70 84 42b 82 42a 80 40 42 42c 42 120f 120b 120d 112e 112c 112a 10
12
14
16
18
20
20
20
22
22
22
24
26
28
30
32
34
122
122

34
40
42
44
50
52
54
60c
62c 24
64
82
68
54
38
34
42
40
24
124
50
122
70
30
80
88
76
78
72
46
52
42
86
72
66
68
48
84
36
44

24
34
42
40
64
66
86
68
74
74
42c
120f
112e
82
120d
42b
112c
78
70
122
42a
120b
112a
80
68
88
84
42

104
84
94
90
96
92
100
98
102
108
106
110
86
112e
112c
112a
Y
118
114
116
120f
88
120d
170b
74
Y
76
78
70
82
64
74
72
68
66
70
68
80
72

38
98
102
88
61
100
54
84
46
50
86
48
104
52
44
42
40
24
42
34
36

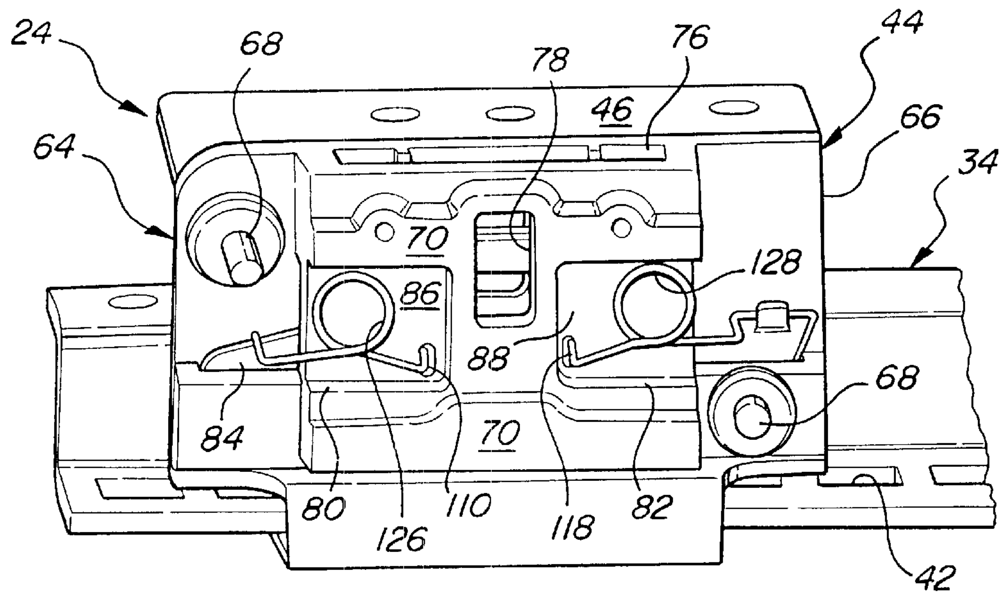
FIG-8
FIG-9
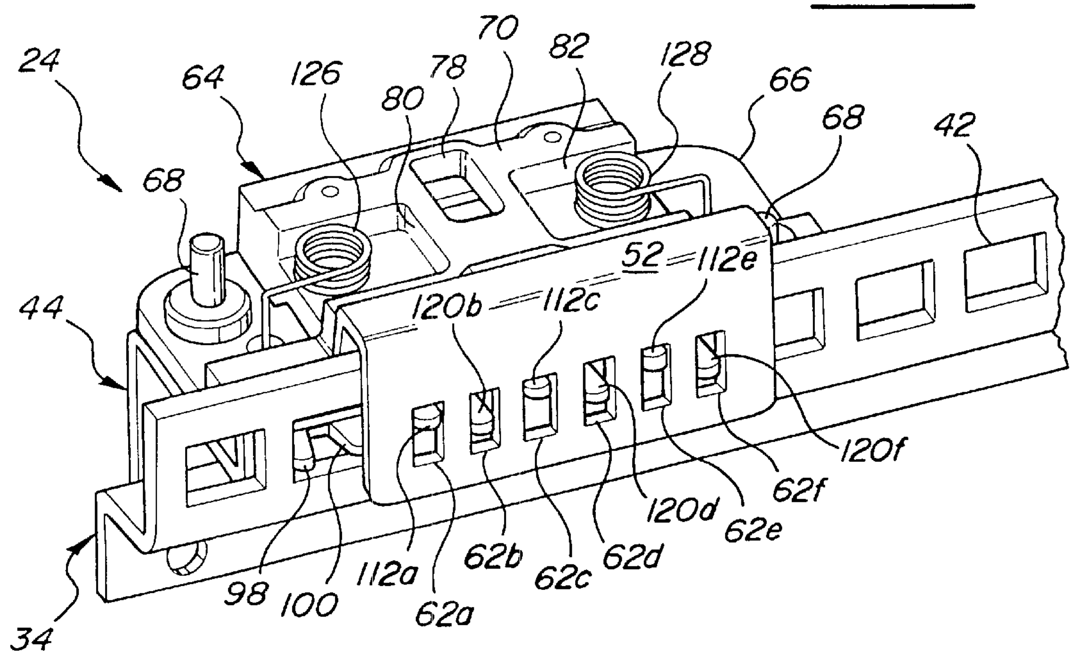

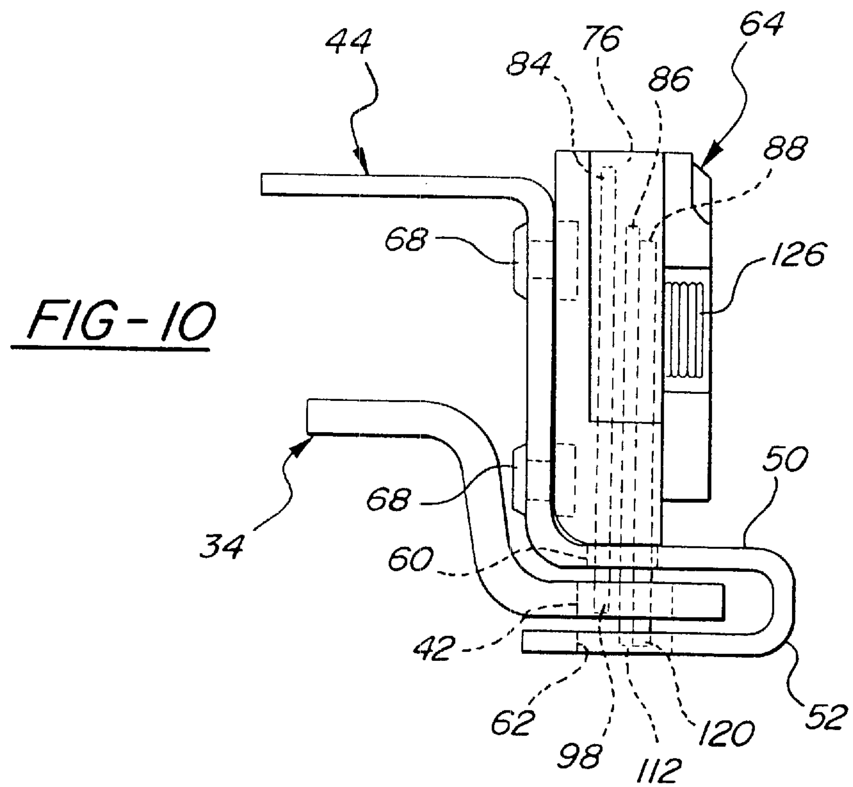
FIG-10
FIG-11
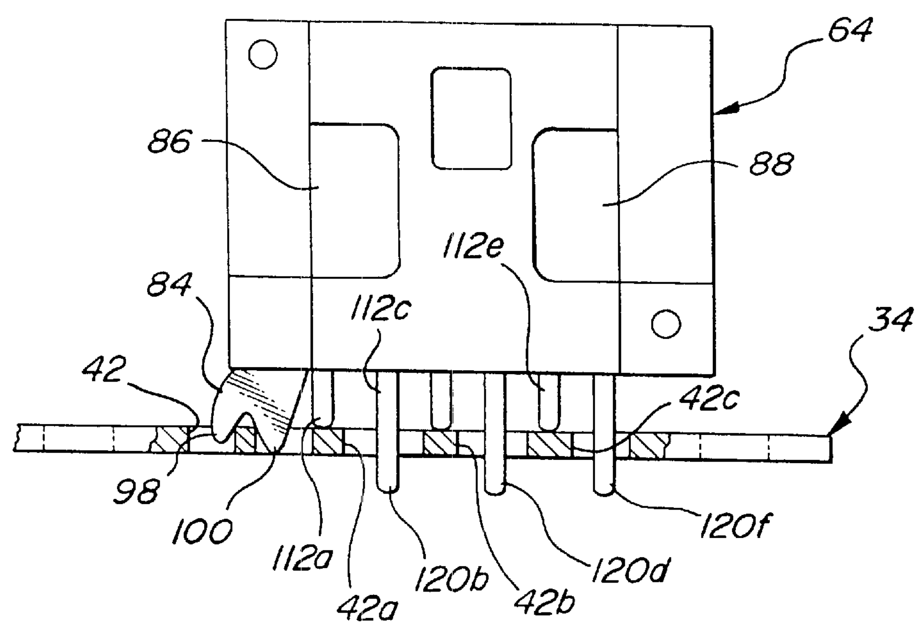

132
130
134d
134c
134b
134a
Z
108
106
110
86
112e
112c
112a
118
Y
114
116
120f
88
120d
120b
Y
74
78
76
70
82
74
64
72
68
66
68
70
80
72

66
64
24
136
86
88
84
98
100
112a
120b
112c
120d
112e
120f 142
144
150
152
120
148
112
146

176
178
164
170
182
170
186
188
184
190
X'
172
166
180
174
160
168
162

210
212
214
218
220
222
222
224
226
228
232
234
36
238
240
242

216
218
220
222
224
226
230
232
234
236
238
240
242

216
242
238
240
222
230
224
220
244
218
234
232

216
242
246
218
234
232
248

252
254
260
258
262
256
250
264
266
262
250
260
258
256

264
250
274
270
272
68
256

264
278
274
276
250
268
256

264
282
280
286
288
270
274
250
268
256
276
284

264
288
280
276
290
282
270
286
294
250
292

302
300
306
304
353

306
324
314
312
334
338
342
340
344
354
356
356
338
340
332
330
328

302
338
330
340
342
332
346
348
352
328
304

306
324
314
312
340
354
356
334
338
332
330
328

346
342
330
340
302
348
352
328
332
304

306
324
312
314
340
354
356
332
338
328
330

302
338
330
342
332
346
348
352
328
340
304

306
338
324
314
312
332
354
328
338
340
330

340
330
342
332
352
348
328
304
302
346

POSITIVE ENGAGEMENT LATCH

RELATED APPLICATIONS

This application is a continuation in part application of U.S. patent application Ser. No. 09/692,836 filed on Oct. 19, 2000 and now issued as U.S. Pat. No. 6,322,036.

BACKGROUND OF THE INVENTION

1. Field of Invention

The subject invention relates to a seat track assembly for a seat assembly of an automotive vehicle. More particularly, the subject invention relates to a seat track assembly having a latch mechanism with a plurality of locking fingers movable between a locked position for interlocking the upper and lower tracks of the seat track assembly and an unlocked position disengaged from the tracks to allow sliding movement therebetween.

2. Description of the Related Art

Latches or locking mechanisms are commonly known in the art for interlocking the upper track and lower track of a manual seat track assembly to prevent relative fore and aft sliding movement therebetween. One type of locking mechanism known in the art utilizes a locking plate operatively secured to the upper track and having a projecting finger for aligning with and engaging an aperture within the lower track to interlock the upper and lower tracks. Examples of these type of locking mechanisms are disclosed in U.S. Pat. Nos. 4,189,957; 4,635,890 and 4,961,559.

However, these locking mechanism are limited in their range of engagement caused by the necessary alignment of the projecting finger with the aperture. That is, the occupant of a seat assembly must properly position the upper track along the lower track until the projecting finger is aligned with the aperture to engage therewith and interlock the upper and lower tracks. This alignment necessity limits the range of adjustable travel of the seat assembly by the seat tracks as well as the range of engagement of the locking mechanism. Further, if the projecting finger is not properly aligned with the aperture, a possibility exists that the upper and lower tracks will not interlock and prevent incidental fore and aft movement of the seat assembly.

Therefore, it is desirable to provide a seat track assembly having a latch assembly or locking mechanism which provides for infinite engagement between the upper and lower track to interlock the tracks and prevent fore and aft movement of the seat assembly.

SUMMARY OF THE INVENTION

According to one aspect of the invention, a seat track assembly is provided for adjusting a seat assembly of an automotive vehicle comprising a lower track having a first plurality of apertures and an upper track slidably mounted to the lower track and having a second plurality of apertures. A latch assembly is fixedly mounted to the upper track. The latch assembly includes a plurality of locking fingers projecting through the apertures in the upper track and adapted to be received in at least one of the apertures in the lower track. An actuator moves the fingers between a locked condition engaged with at least one of the apertures in the lower track and an unlocked condition spaced from each of the apertures in the lower track and a biasing member biases the fingers to the locked condition regardless of a relative position between the upper and lower tracks.

BRIEF DESCRIPTION OF THE DRAWINGS

Other advantages of the present invention will be readily appreciated as the same becomes better understood by reference to the following detailed description when considered in connection with the accompanying drawings wherein:

FIG. 8 is a top perspective view of the assembled locking mechanism;

FIG. 9 is bottom perspective view of the locking mechanism of FIG. 8;

FIG. 10 is an end view of the locking mechanism of FIG. 8;

FIG. 11 is a partially sectioned front view of the locking mechanism;

DETAILED DESCRIPTION OF THE EMBODIMENTS

Figure 1:
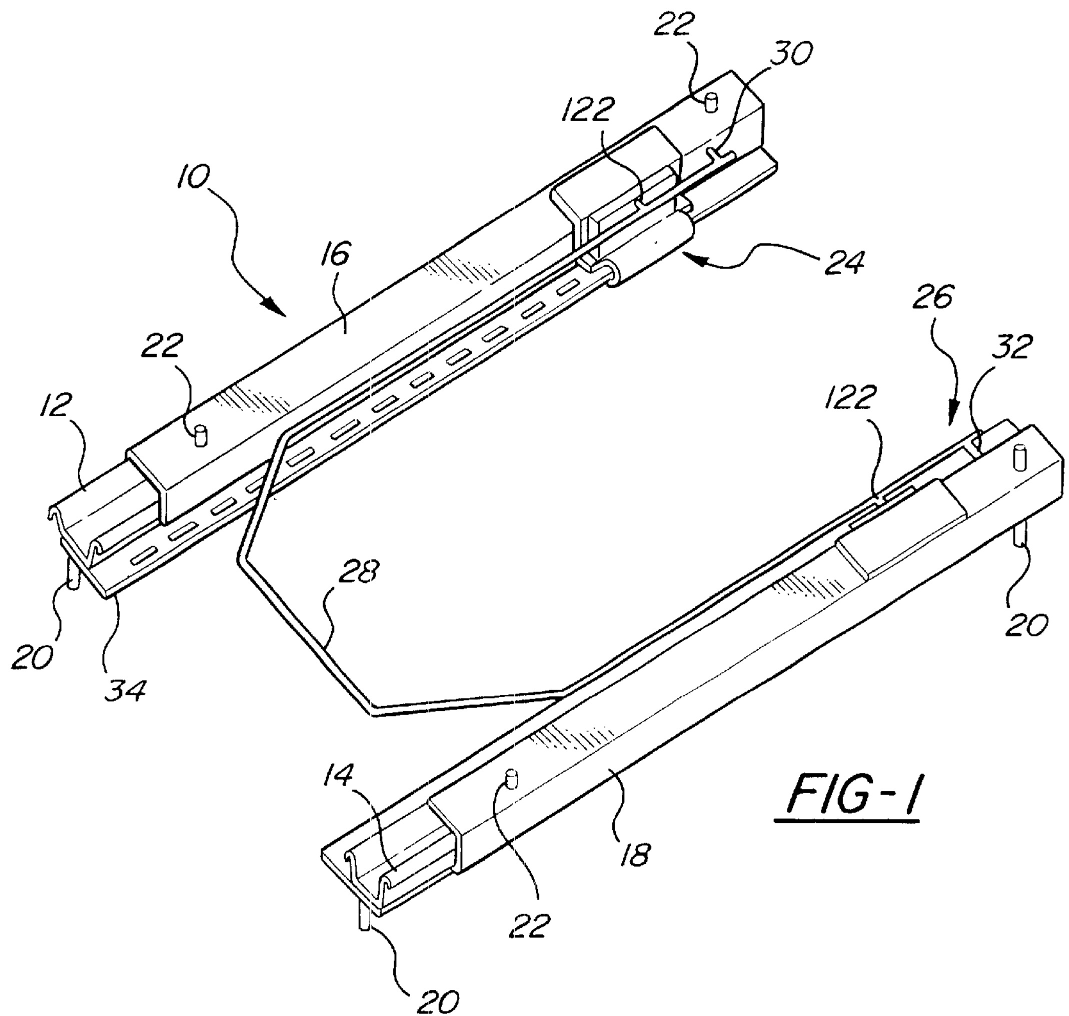
FIG. 1 is a perspective view of a seat track assembly according to one embodiment of the invention.

Referring to FIG. 1, a seat track assembly for use in an automotive vehicle is generally shown at 10. The seat track assembly 10 supports a seat assembly within the vehicle and provides both fore and aft sliding adjustment of the seat assembly. The seat track assembly includes a pair of spaced apart and parallel longitudinally extending lower tracks 12, 14 and a pair of spaced apart and parallel longitudinally extending upper tracks 16, 18 slidably coupled to the respective lower tracks 12, 14. The lower tracks 12, 14 include a plurality of mounting fasteners 20 for fixedly securing the track assembly 10 within the vehicle. Similarly, the upper tracks 16, 18 include a plurality of mounting fasteners 22 for fixedly mounting the seat assembly to the track assembly 10 as is commonly known to one skilled in the art. The upper tracks 16, 18 have a complementary cross-section shape to the lower tracks 12, 14 and are slidably disposed along the lower tracks 12, 14 for providing sliding fore and aft adjustment of the seat assembly mounted thereto. The upper and lower tracks may be of any suitable design or configuration as is known in the art, including those described in U.S. Pat. Nos. 5,046,698; 5,597,206; 5,732,923; and 5,741,000, the disclosures of which are incorporated herein by reference.

The seat track assembly 10 further includes a pair of locking mechanisms 24, 26 for interlocking the upper tracks 16, 18 with the respective lower tracks 12, 14 along the longitudinal length thereof. The locking mechanism 24 is coupled between the upper track 16 and lower track 12. The locking mechanism 26 is coupled between the upper track 18 and lower track 14. A release handle 28 extends between and interconnects the locking mechanisms 24, 26 to synchronize actuation of the locking mechanisms 24, 26 between a released condition allowing sliding movement between the upper tracks 16, 18 and lower tracks 12, 14 and a locked condition preventing movement between the upper tracks 16, 18 and lower tracks 12, 14. The release handle 28 is generally U-shaped and extends between a first end pivotally connected by pivot pin 30 to the upper track 16 and a second end pivotally connected by pivot pin 32 to the upper track 18. The upper tracks 16, 18; lower tracks 12, 14; and locking mechanisms 24, 26 are substantially identical and mirror images of one another, and therefore, only tracks 12, 16 and locking mechanism 24 will be described in detail.

Figure 2:
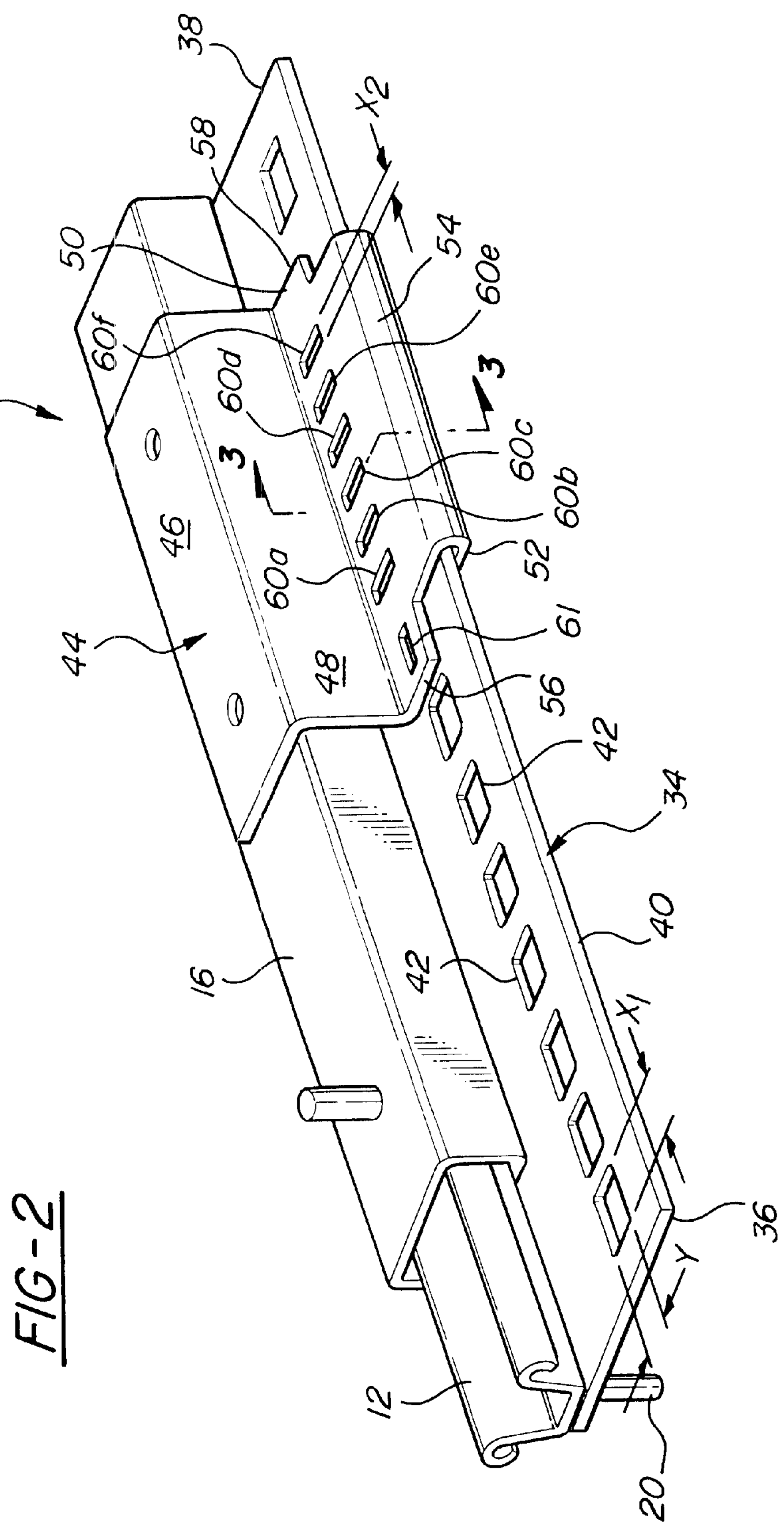
FIG. 2 is a perspective view of the upper and lower tracks of the seat track assembly.

Referring to FIG. 2, the locking mechanism 24 includes a fixed lock plate 34 secured to the lower track 12. More specifically, the fixed lock plate 34 is a generally planar plate fixedly secured to the bottom of the lower track 12 and extending the longitudinal length thereof between a first end 36 and opposite second end 38. The fixed lock plate 34 further projects or extends laterally outwardly from the lower track 12, toward the opposite lower track 14 as shown in FIG. 1, to a lateral edge 40 extending longitudinally between the first 36 and second 38 ends. The lock plate 34 further includes a plurality of spaced apart locking apertures 42 extending through the lock plate 34. The apertures 42 are spaced between the lateral edge 40 and the side of the lower track 12 and extend along a linear path between the first end 36 and second end 38. Each of the apertures 42 has a common predetermined length designated as X1 and a common predetermined width designated as Y.

Still referring to FIG. 2, the locking mechanism 24 further includes a moving lock plate 44 secured to the upper track 16. The moving lock plate 44 has a generally S-shaped cross-section and includes a top horizontal plate 46 fixedly secured to the top surface of the upper track 16 by fasteners, rivets, welds, or the like and a side vertical plate 48 extending generally perpendicularly from the top plate 46 to the fixed lock plate 34. The moving lock plate 44 further includes an upper locking plate 50 extending generally perpendicularly from the side plate 48 adjacent the top surface of the fixed lock plate 34 and a lower locking plate 52 generally parallel to the upper locking plate 50 and adjacent the bottom surface of the fixed lock plate 34. The upper locking plate 50 and lower locking plate 52 are joined by a C-shaped portion 54 curling around the lateral edge 40 of the fixed lock plate 34. The upper 50 and lower 52 locking plates extend along a longitudinal portion of the fixed lock plate 34 between a front edge 56 and a rear edge 58. The upper locking plate 50 includes a plurality of spaced apart first alignment apertures 60*a–f* extending through the locking plate 50. The apertures 60*a–f* are spaced between the side plate 48 and C-shaped portion 54 and extend along a linear path between the front edge 56 and rear edge 58. Each of the apertures 60*a–f* has a predetermined Width, designated as X2, which is approximately half of the length X1 of the apertures 42. The upper locking plate 50 further includes a cam slot 61 passing therethrough and aligned generally perpendicular to the length of the apertures 60*a–f*. The lower locking plate 52 similarly includes a plurality of spaced apart second alignment apertures 62*a–f* extending through the locking plate 52, best shown in FIG. 5. The second apertures 62*a–f* are aligned vertically with the first apertures 60*a–f*, respectively, and have the same predetermined width X2. In the preferred embodiment, the moving lock plate 44 includes six equally spaced apart first and second alignment apertures 60, 62 in the respective upper 50 and lower 52 locking plates, however, it should be appreciated that the number of apertures 60, 62 may vary.

Figure 3:
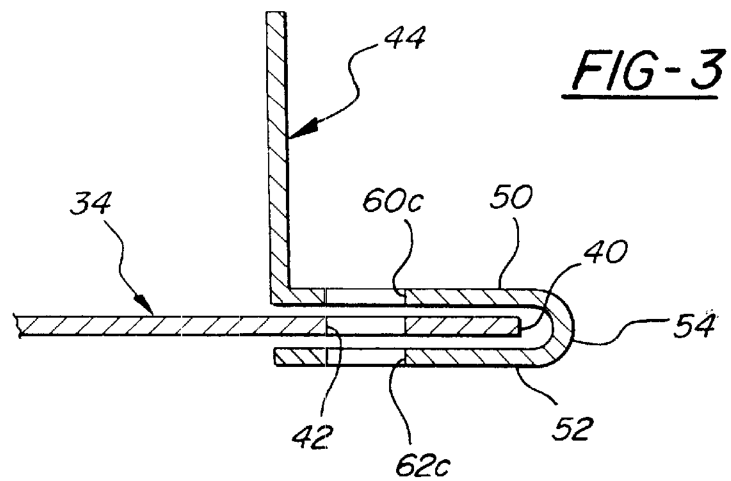
FIG. 3 is a cross-sectional view taken along line 3—3 of FIG. 2.

Referring to FIG. 3, a cross-sectional view is shown taken along line 3—3 of FIG. 2 showing the relationship of the fixed lock plate 34 seated between the upper locking plate 50 and lower locking plate 52 such that the apertures 42, 60, 62 are generally vertically aligned.

Figure 4:
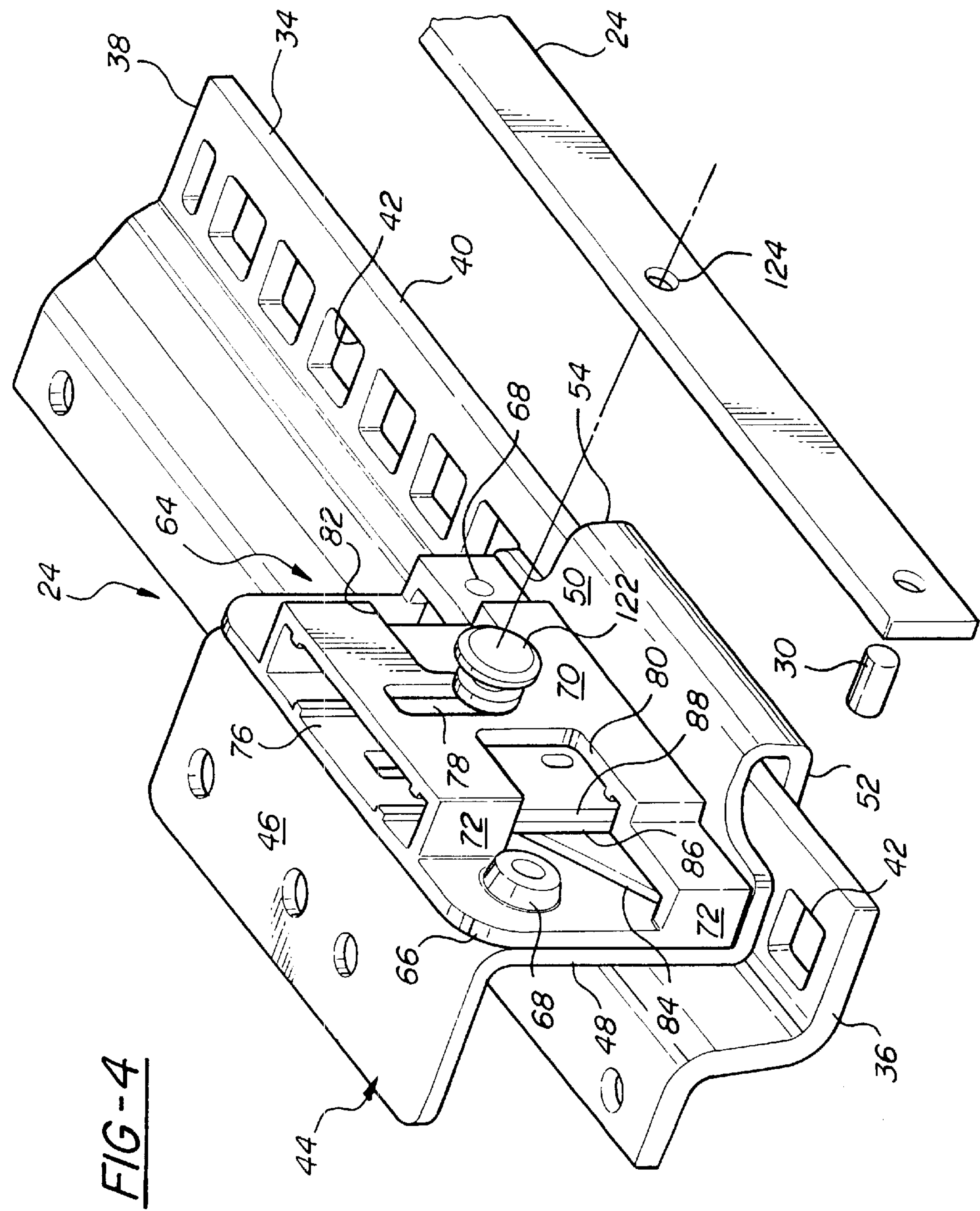
FIG. 4 is a partially exploded perspective view of a locking mechanism according to one embodiment of the invention.
Figure 5:
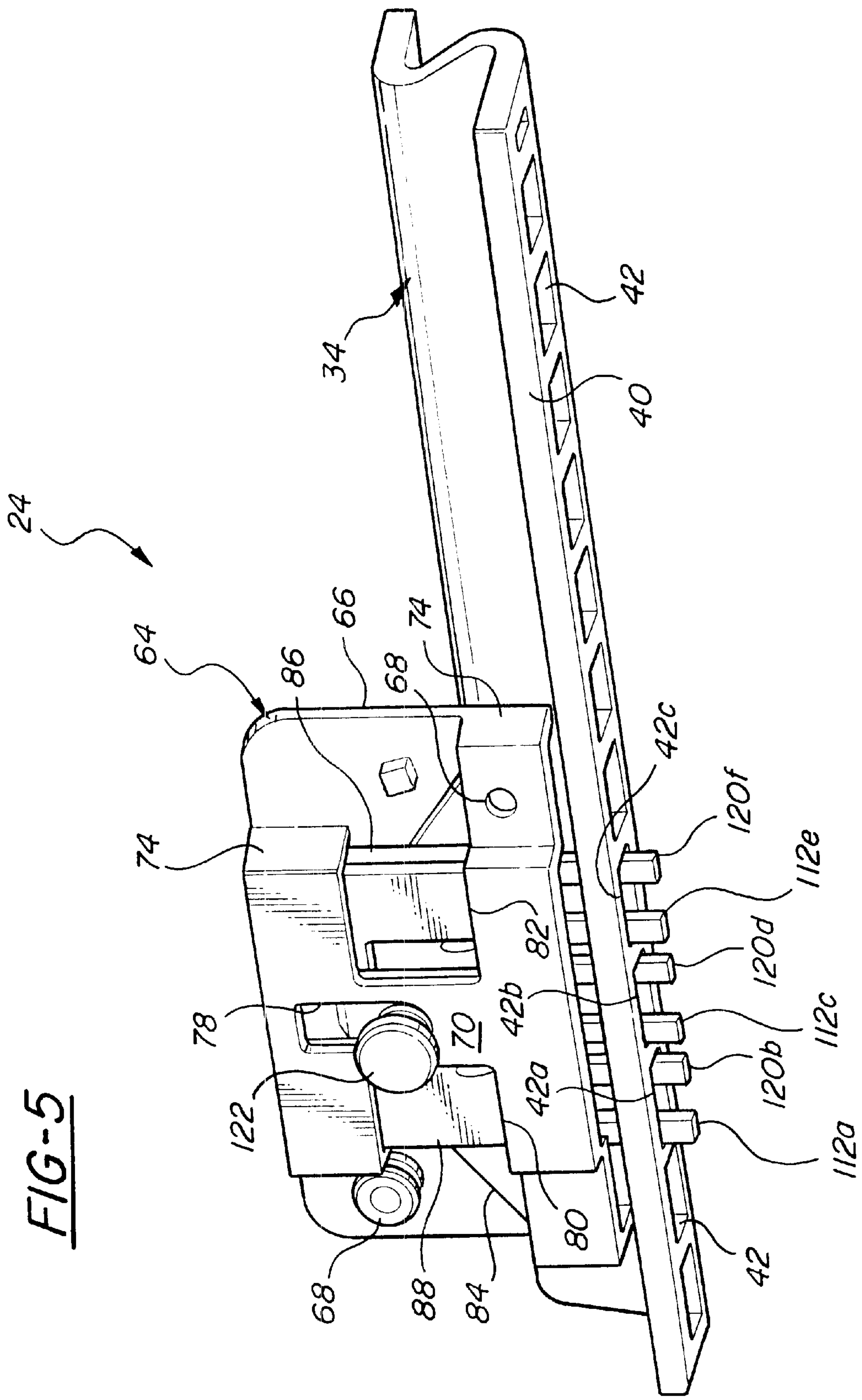
FIG. 5 is another perspective view of the locking mechanism with a moving lock plate removed.
Figure 6:
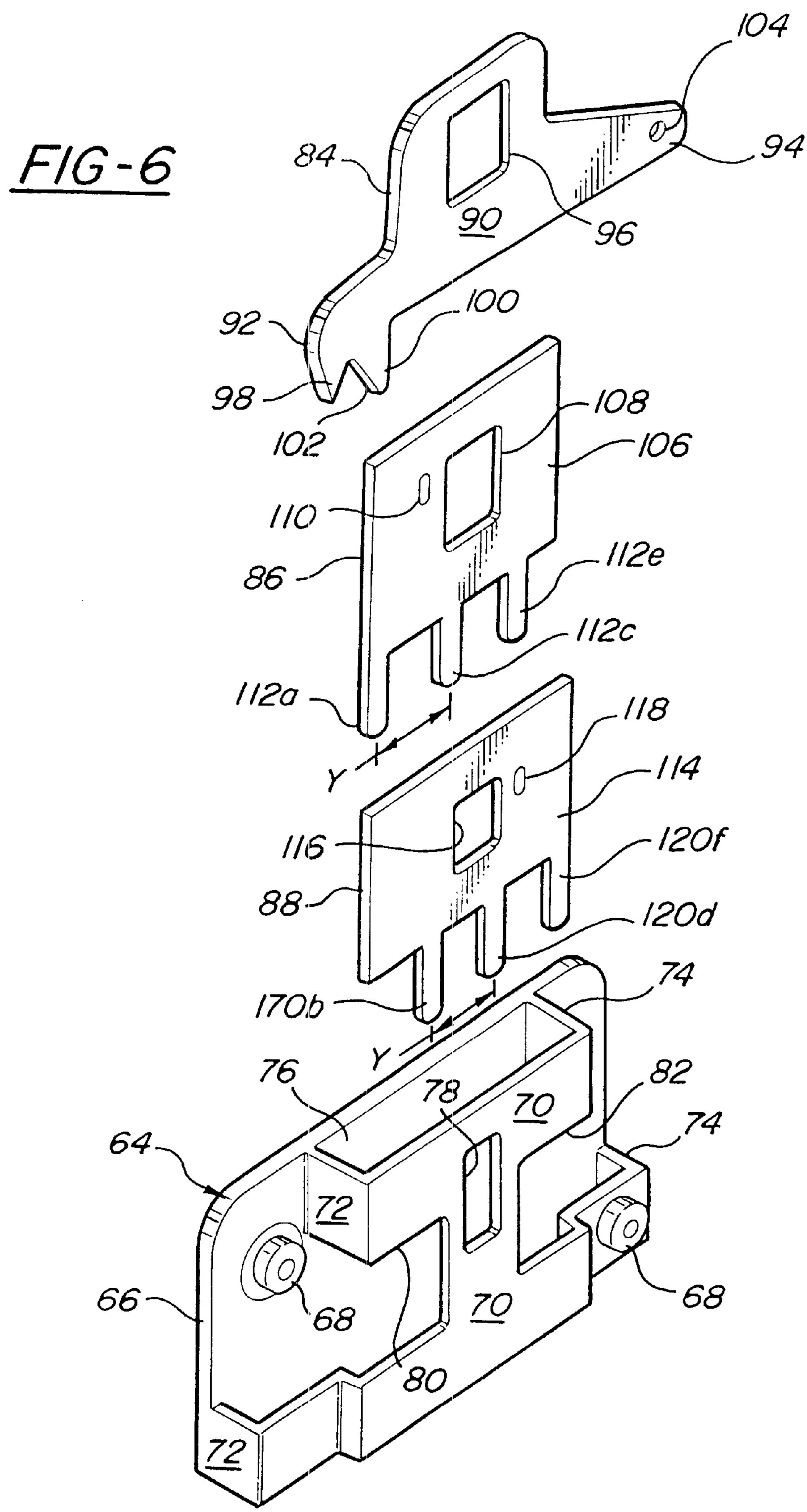
FIG. 6 is an exploded view of a housing and a plurality of plates of the locking mechanism.

Referring to FIGS. 4, 5 and 6, the locking mechanism 24 further includes a housing 64. The housing 64 includes a planar back plate 66 fixedly secured to the side plate 48 of the moving lock plate 44 by fasteners 68, bolts, rivets, or the like, to seat the housing 64 directly above the upper locking plate 50. The housing 64 further includes a front plate 70 spaced from and generally parallel to the back plate 66 by opposing side walls 72, 74 to define a channel 76 in the housing 64. The front plate 70 includes a center window 78 passing therethrough and a pair of side notch openings 80, 82 providing access into the channel 76. The channel 76 is aligned with the plurality of first apertures 60 in the upper locking plate 50 of the moving lock plate 44. The housing 64 operatively supports a plurality of plates 84, 86, 88 for generally vertical movement within the channel 76 for providing interlocking engagement between the fixed lock plate 34 and the moving lock plate 44.

Figure 7:
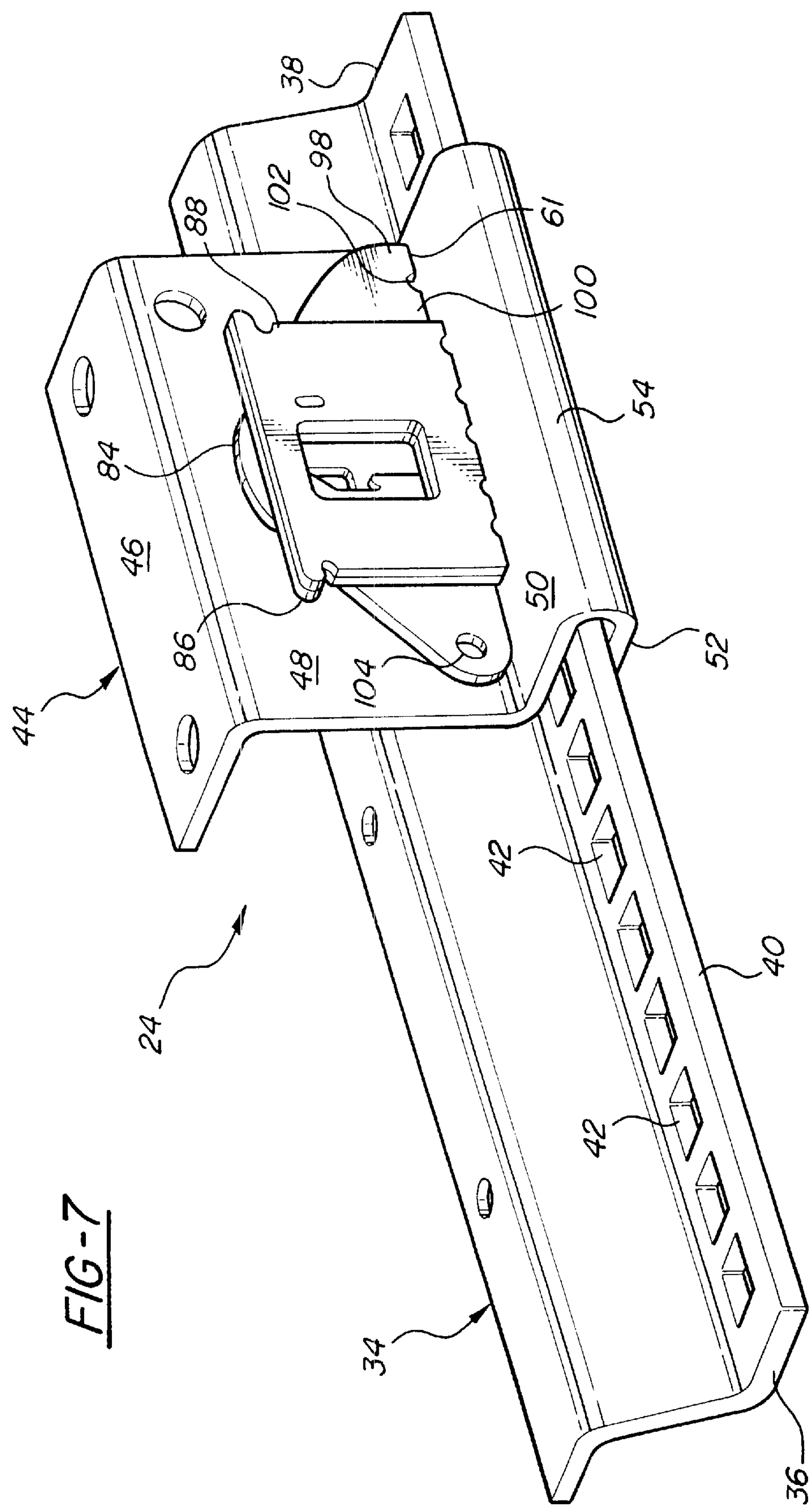
FIG. 7 is a perspective view of the plates supported on the moving lock plate with the housing removed.

More specifically, referring to FIGS. 6 and 7, a cam plate 84 includes an elongated body portion 90 extending between a first cam end 92 and a second pivot end 94. A center window 96 passes through the body portion 90 and is dimensioned to align with the center window 78 in the housing 64. A pair of cam wedge teeth 98, 100 project downwardly from the cam end 92 and are spaced apart by a V-shaped notch 102. A pivot bore 104 passes through the pivot end 94. The cam plate 84 is seated with the channel 76 of the housing 64 against the back plate 66 with the cam end 92 adjacent the side wall 72 and the pivot end 94 adjacent the side wall 74. The cam plate 84 is pivotally secured to the housing 64 by one of the fasteners 68 passing through the pivot bore 104. Thus, the cam plate 84 may pivot about the pivot bore 104 within the channel 76 between a locked position and an unlocked position. As shown in FIG. 7, with the housing 64 removed for illustrative purposes, the wedge teeth 98, 100 are seated within the cam slot 61. In the locked position, the cam plate 84 is pivoted such that the wedge teeth 98, 100 extend through the cam slot 61 and below the upper locking plate 52 to either both be received within one of the apertures 42 in the lock plate 34 or straddling the portion of the lock plate 34 between adjacent apertures 42. That is, the wedge teeth 98, 100 may be received in independent and immediately adjacent apertures 42 with the notch 102 straddling the portion of the lock plate 34 separating the adjacent apertures.

A pair of first and second shear plates 86, 88 are also operatively supported within the channel 76 of the housing 64. Referring to FIG. 7, the first shear plate 86 includes a base plate 106 having an offset window opening 108 therethrough and a spring slot 110 adjacent the opening 108. A plurality of engagement fingers 112*a*, 112*c*, and 112*e* project downwardly from the base plate 106. The fingers 112*a,c,e* are equally spaced apart and offset relative to the centerline of the base plate 106. That is, the fingers 112*a,c,e* are skewed to project from the base plate 106 starting from the left side of the plate 106 as shown in FIG. 7. The fingers 112*a,c,e* are displaced from each other, or spaced apart, by a displacement gap defined as Y. The first shear plate 86 is slidably received within the channel 76 of the housing 64 and seated against the cam plate 84, as shown in FIG. 7. The fingers 112*a,c,e* are dimensioned to be received through the first apertures 60*a–c*, respectively, in the moving lock plate 44. The first shear plate 86 is also operable between a locked position and an unlocked position. In the unlocked position, the fingers 112*a,c,e* are seated within the first apertures 60*a–c* of the upper locking plate 50, but, spaced above the fixed lock plate 34. In the locked position, the shear plate 86 slides downwardly within the channel 76 such that the fingers 112*a,c,e* extend through adjacent apertures 42 in the fixed lock plate 34 and into the second apertures 62*a–c*, respectively, of the lower locking plate 52.

The second shear plate 88 is essentially identical to the first shear plate 86. That is, the second shear plate 88 includes a base plate 114 having an offset window opening 116 therethrough and a spring slot 118 adjacent the opening 116. A plurality of engagement fingers 120*b*, 120*d*, 120*f* project downwardly from the base plate 114. The fingers 120*b,d,f* are equally spaced apart and offset relative to the centerline of the base plate 114. However, the second shear plate 88 is inverted or a mirror image relative to the first shear plate 86, as shown in FIG. 6. As a result, the fingers 120*b,d,f* are skewed to project from the base plate 114 starting from the right side of the plate 114 such that the fingers 120*b,d,f* of the second shear plate 88 are a mirror image of the fingers 112*a,c,e* of the first shear plate 86 wherein each of the fingers 112*a,c,e* and 120*b,d,f* are equally spaced along a longitudinal row between the side walls 72, 74 of the housing 64. The fingers 120*b,d,f* are also displaced from each other, or spaced apart, by an equivalent displacement gap Y. The second shear plate 88 is also slidably received within the channel 76 of the housing 64 and seat against the first shear plate 86, as shown in FIG. 7. The fingers 120*b,d,f* are dimensioned to be received through the first apertures 60*d–f*, respectively, in the moving lock plate 44. The second shear plate 88 is also operable between a locked position and an unlocked position. In the unlocked position, the fingers 120*b,d,f* are seated within the first apertures 60*d–f* of the upper locking plate 50, but, spaced above the fixed lock plate 34. In the locked position, the shear plate 88 slides downwardly within the channel 76 such that the fingers 120*b,d,f* extend through adjacent apertures 42 in the fixed lock plate 34 and into the second apertures 62*d–f*, respectively, of the lower locking plate 52.

Referring again to FIG. 4, a guide pin 122 extends through the center window 78 in the housing 64 and through each of the window openings 96, 108, 116 of the respective cam plate 84, first shear plate 86 and second shear plate 88 for actuating the plates 84, 86, 88 from the locked position to the unlocked positions as will be described in greater detail below. The release handle 28 includes a guide bore 124 for securing the guide pin 122 to the release handle 28. The guide bore 124 is spaced from the attachment of the pivot pin 30 to the release handle 28.

Referring to FIGS. 8–10, the locking mechanism 24 further includes a pair of biasing members 126, 128 for biasing each of the cam plate 84, first shear plate 86 and second shear plate 88 in the locked position. The biasing member 126 is a coil spring having a first end engaged with the top of the cam plate 84 and a second end received in the spring slot 110 of the first shear plate 86. The member 126 is coiled and seated within the notch 80 to bias both the cam plate 84 and shear plate 86 in the locked position. The biasing member 128 is also a coil spring having a first end secured to the back plate 66 of the housing 64 and a second end received in the spring slot 118 of the second shear plate 88. The member 128 is similarly coiled and seated within the notch 82 to bias the shear plate 88 in the locked position.

In operation, when the seat track assembly 10 is properly aligned to fully interlock the lower tracks 12, 14 with the upper tracks 16, 18, the engagement fingers 112, 120 of the first 86 and second 88 shear plates extend through the bottom of the channel 76 in the housing 64 and into the respective apertures 60, 62 of the upper 50 and lower 52 locking plates. The fingers 112, 120 also extend through the apertures 42 of the fixed lock plate 34 sandwiched between the upper locking plate 50 and lower locking plate 52, as shown in FIG. 9. More specifically, the fingers 112*a*, 112*c* and 112*e* extend through the apertures 60*a*, 60*c*, and 60*e*, respectively, of the upper locking plate 50 as well as the apertures 62*a*, 62*c* and 62*e*, respectively, of the lower locking plate 52. The fingers 120*b*, 120*d* and 120*f* extend through the apertures 60*b*, 60*d* and 60*f*, respectively, of the upper locking plate 50 as well as the apertures 62*b*, 62*d*, and 62*f*, respectively, of the lower locking plate 52. As shown in FIG. 5, with the moving lock plate 44 removed, since the width of the apertures 42 (X1) in the fixed lock plate 34 is approximate twice the width of the apertures 60, 62 (X2), the apertures 42 are capable of receiving more than one engagement finger 112, 120 of the first 86 and second 88 shear plates therethrough. That is, fingers 112*a* and 120*b* are received through a single first aperture 42*a*; fingers 112*c* and 120*d* are received through a single second aperture 42*b* adjacent to the first aperture 42*a*; and fingers 112*e* and 120*f* are received through a single third aperture 42*c* adjacent to the second aperture 42*b*.

Additionally, the wedge teeth 98, 100 of the cam plate 84 extend through the bottom of the channel 76 in the housing and into the cam slot 61 of the upper locking plate 50. The wedge teeth 98, 100 also further extend into one of the apertures 42 of the fixed lock plate 34. Specifically, as shown in FIG. 5, both of the wedge teeth 98, 100 are shown in the aperture 42 immediately adjacent the first aperture 42*a*. The cam plate 86 and wedge teeth 98, 100 provide an anti-chuck device to prevent any movement or rattle between the fingers 112, 120 and the apertures 60, 62, 42 caused by tolerance inaccuracy by being wedged between the opposing walls defining the aperture 42.

If the seat occupant desires to adjust the fore and aft position of the seat assembly via the seat track assembly 10, the occupant actuates the release handle 28 extending between the spaced apart upper tracks 16, 18, as shown in FIG. 1, by lift upwardly on the release handle 28. The release handle 28 pivots about pins 30, 32 and lifts the guide pins 122 upwardly within the center window 78 of the housing 64. The guide pin 122 engages with center window 96 of the cam plate 84 and each of the offset openings 108, 116 of the respective shear plates 86, 88 to lift each of the plates 84, 86, 88 from the locked position to the unlocked position against the biasing force of the coil springs 126, 128. The shear plates 86, 88 are lifted generally vertically within the channel 76 of the housing 64 and the cam plate 84 is pivoted about the pivot bore 104 within the channel 76. As the plates 84, 86, 88 are actuated to the unlocked position, the wedge teeth 98, 100 of the cam plate 84 are removed from the aperture 42 in the fixed lock plate 34 and the fingers 112, 120 of the respective shear plates 86, 88 are removed from the apertures 62 in the lower locking plate 52 as well as the apertures 42 in the fixed lock plate 34. With each of the plates 84, 86, 88 in the unlocked position, the upper tracks 16, 18 are free to slide relative to and along the lower tracks 12, 14 to provide fore and aft adjustment of the seat assembly.

Once the seat assembly is adjusted to the desired fore and aft position by the occupant, the release handle 28 may be released to its nominal position. The coil springs 126, 128 bias the plates 84, 86, 88 downwardly within the channel 76 from the raised unlocked position to the lower locked position. If the upper 16, 18 and lower 12, 14 tracks of the seat track assembly 10 are fully aligned, the engagement fingers 112, 120 of the shear plates 86, 88 will be forced downwardly through the channel 76 and back into engagement with, or received within, the respective apertures 60, 62 in the upper 50 and lower 52 locking plates, as well as with correspondingly aligned apertures 42 in the fixed lock plate 34 to fully interlock the upper tracks 16, 18 with the lower tracks 12, 14. Additionally, the wedge teeth 98, 100 will also be received within an aperture 42 of the fixed lock plate 34.

The locking mechanism 24 further ensures that at least the fingers 112, 120 of one of the shear plates 86, 88 are received within the apertures 42 to interlock the upper 16, 18 and lower 12, 14 tracks when the plates 84, 86, 88 and the locking mechanism 24 is in the locked position. That is, if the occupant releases the release handle 28 and each of the fingers 112, 120 are not vertically aligned with apertures 42, at least one of the shear plates 86, 88 will still engage with the fixed lock plate 44 to ensure the upper 16, 18 and lower 12, 14 tracks are interlocked and prevent further fore and aft sliding movement therebetween. Specifically, referring to FIG. 11, the release handle 28 may be release with the locking mechanism 24 in a position wherein only the fingers 120*b,d,f* of the second shear plate 88 are aligned with the apertures 42*a*, 42*b*, 42*c*. It should be appreciated that the fingers 112, 120 are always aligned with the apertures 60, 62 in the respective upper locking plate 50 and lower locking plate 52. However, these one set of the apertures 60, 62 and corresponding fingers 112, 120 may not be aligned with the apertures 42 in the fixed lock plate 44. As shown in FIG. 11, the locking mechanism 24 is position with the fingers 120*b*, 120*d* and 120*f* of the shear plate 88 are aligned with and received through the apertures 42*a*, 42*b* and 42*c*, respectively, of the fixed lock plate 34. However, the fingers 112*a*, 112*c* and 112*e* of the shear plate 86 are not aligned with or extending into any of the apertures 42*a*, 42*b* or 42*c*. In this position, the fingers 112*a*, 112*c* and 112*e* extend through the apertures 60*a*, 60*c* and 60*e*, but, engage and rest on the top portions, or ribs, of the fixed lock plate 34 between the adjacent and consecutive apertures 42, 42*a*, 42*b* and 42*c*. Since the width of the apertures 42 (X1) is approximately twice the width of the apertures 60, 62 (X2), and thus the width and spacing between the offset and mirrored fingers 112, 120 (Y), every other finger, i.e. 112*a* or 120*b*; 112*c* or 120*d*; 112*e* or 120*f*, will align with and be forced into the apertures 42*a*, 42*b*, 42*c*. This ensures that at least one of the shear plates 86, 88 of the locking mechanism 24 engages with the fixed lock plate 34 to interlock the upper tracks 16, 18 with the lower tracks 12, 14 and prevent fore and aft movement therebetween in the locked position.

Additionally, the spacing of the wedge teeth 98, 100 by the V-shaped notch 102 of the cam plate 84 is still able to engage with the fixed lock plate 34 for anti-chuck and anti-rattle. Specifically, as shown in FIG. 11, the wedge teeth 98, 100 are shown straddling a portion of the fixed lock plate 34 between adjacent apertures 42 where each of the wedge teeth 98, 100 are received within a separate yet adjacent aperture 42. The portion of the lock plate 34 between the apertures 42 is wedged within the notch 102 to prevent chuck and rattle.

Therefore, the locking mechanism 24 provides infinite engagement between the upper tracks 16, 18 and lower tracks 12, 14 and ensures the tracks are interlocked and the seat assembly restrained from further fore and aft movement in the locked position whenever and wherever the occupant releases the release handle 28.

Figure 12:
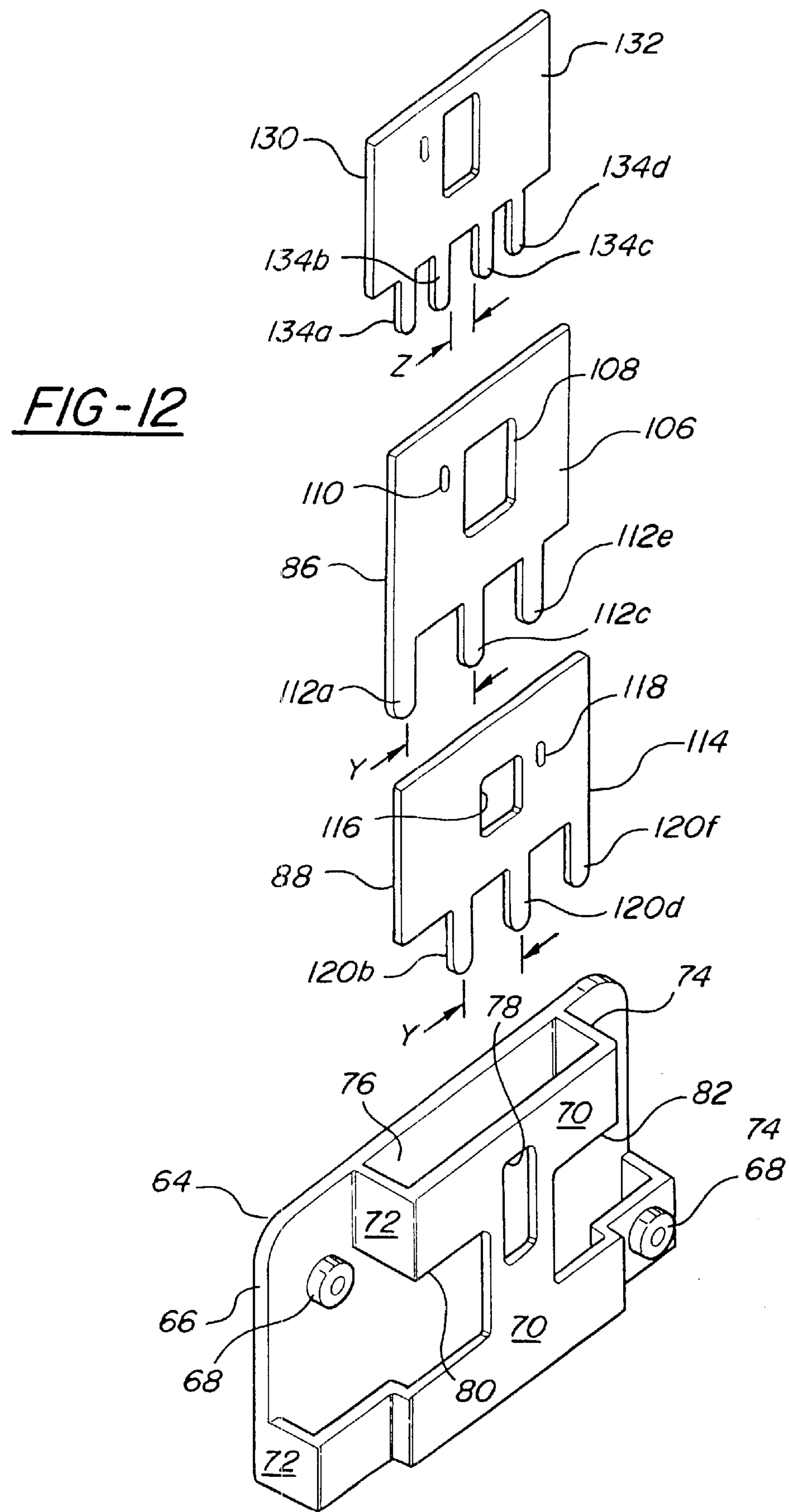
FIG. 12 is an exploded view of an alternative embodiment of plates.

In an alternative embodiment, the cam plate 84 may be substituted or replaced with a third shear plate 130 as shown in FIG. 12. The third shear plate includes a base plate 132 having a plurality of engagement fingers 134*a–d* projecting downwardly from the base plate 132. However, with four fingers 134*a–d*, the fingers 134 are not offset, but rather, spaced equally apart and centered along the bottom of the base plate 132. Further, the fingers 134 are displaced apart by a gap Z, which is less than the displacement gap Y of the fingers 112, 120 of the shear plates 86, 88. As such, the fingers 134*a*, 134*b*, 134*c*, 134*d* are received within the apertures 60*b*, 60*c*, 60*d*, 60*e* of the upper locking plate 50 and the apertures 62*b*, 62*c*, 62*d*, 62*e* of the lower locking plate 52, respectively. The fingers 134 of the third shear plate 130 are also received with the apertures 42 of the fixed lock plate 34, between the fingers 112, 120, to further reduce any gap between any of the fingers and the apertures 42. This reduces vibration, rattle and chuck similar to the cam plate 84 and also provide a third "lock" to the seat track assembly 10 in addition to the first 86 and second 88 shear plates.

Figure 13:
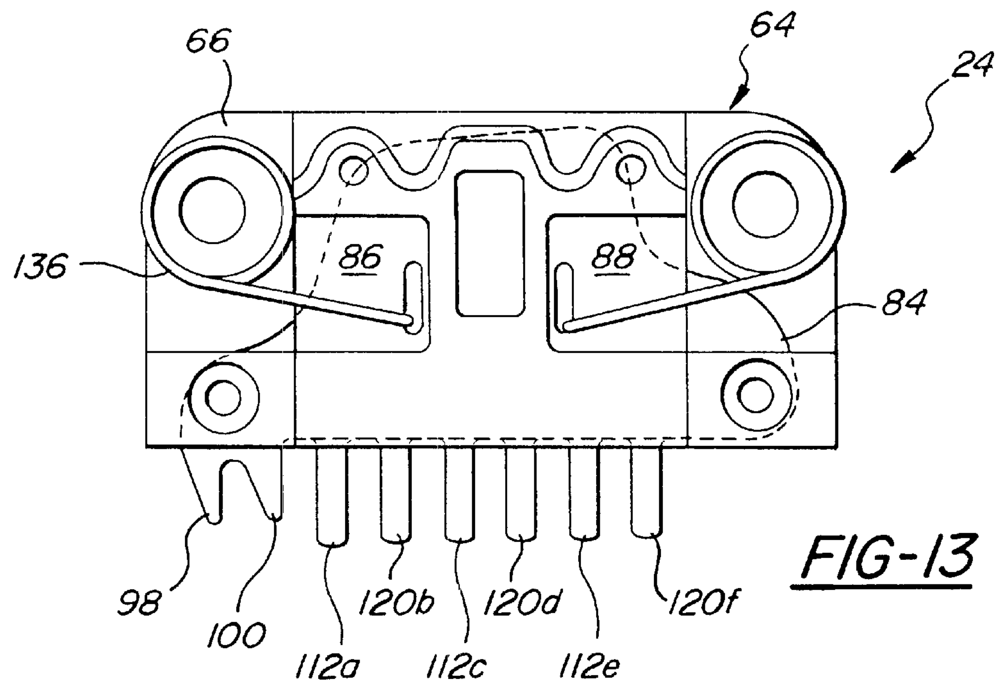
FIG. 13 is a front view of an alternative embodiment of biasing members of the locking mechanism.

Referring to FIG. 13, an alternative biasing member arrangement is shown for urging the plates 84, 86, 88 in the locked position. The arrangement includes a first torsion spring 136 attached between the back plate 66 of the housing and the shear plate 86 and a separate second torsion spring 138 attached between the back plate 66 and the shear plate 88. Additionally, a third omega spring 140 includes a first free end secured to the housing 64 and a second free end secured to the cam plate 84. The springs 136, 138, 140 each independently bias the respective plates 84, 86, 88 to the locked position engaged with the apertures 42 of the fixed lock plate 34. It should be appreciated that any number of and many other configurations of biasing members may be utilized including torsion bars, leaf springs, spring plates and the like, without varying from the scope of the invention.

Figure 14:
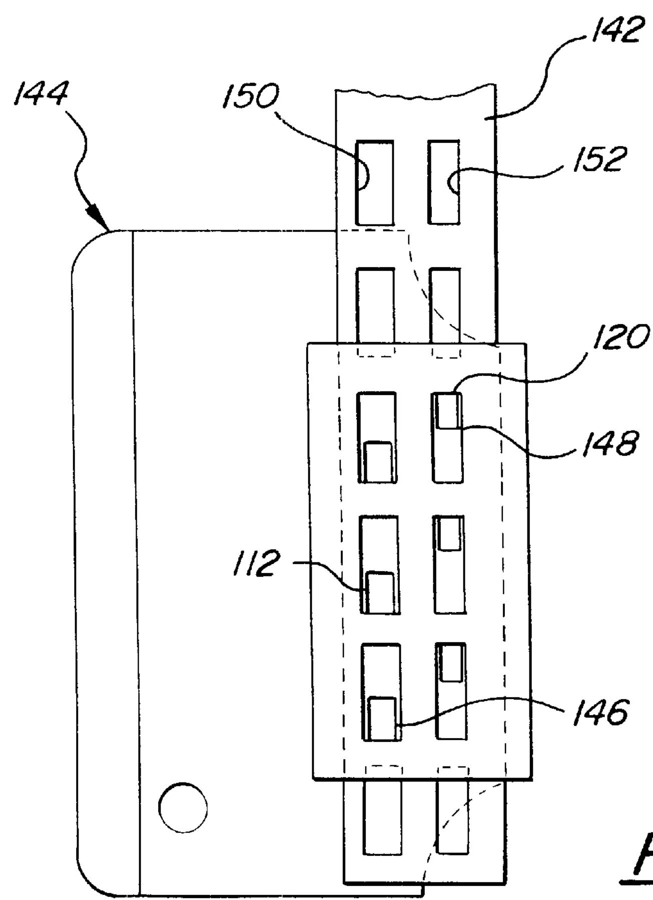
FIG. 14 is an alternative embodiment of the fixed lock plate and moving lock plate.

Referring to FIG. 14, an alternative fixed lock plate is shown at 142 and an alternative moving lock plate is shown at 144. The moving lock plate 144 includes a first row of apertures 146 aligned for receiving the fingers 112 of the shear plate 86 and a second row of apertures 148 aligned for receiving the fingers 120 of the shear plate 88. The first row of apertures 146 are spaced apart, parallel and staggered from the second row of apertures 148 for proper alignment with the offset mirror-imaged fingers 112, 120. The fixed lock plate 142 is seated between the upper locking plate 50 and lower locking plate 52 as in the preferred embodiment. The fixed lock plate 142 includes a pair of spaced apart and parallel row of locking apertures 150, 152. The first row of locking apertures 150 are aligned vertically with the row of apertures 146 while the second row of locking apertures 152 are aligned vertically with the row of apertures 148. This arrangement of rows of apertures 150, 152 allows the fingers 112, 120 to be received within independent locking apertures 150, 152 when the locking mechanism 24 is in the locked position such that the shear forces exerted on the fingers 112, 120, more particularly, the portion of the fixed lock plate 142 between the adjacent rows of apertures 150, 152 is separated and thus reduced. That is, the shear forces on the fixed lock plate 142 are spread over a greater area by separating the engagement of the fingers 112, 120 along the lock plate 142 by having independent rows of locking apertures 150, 152 associated with the respective fingers 112, 120.

Figure 15:
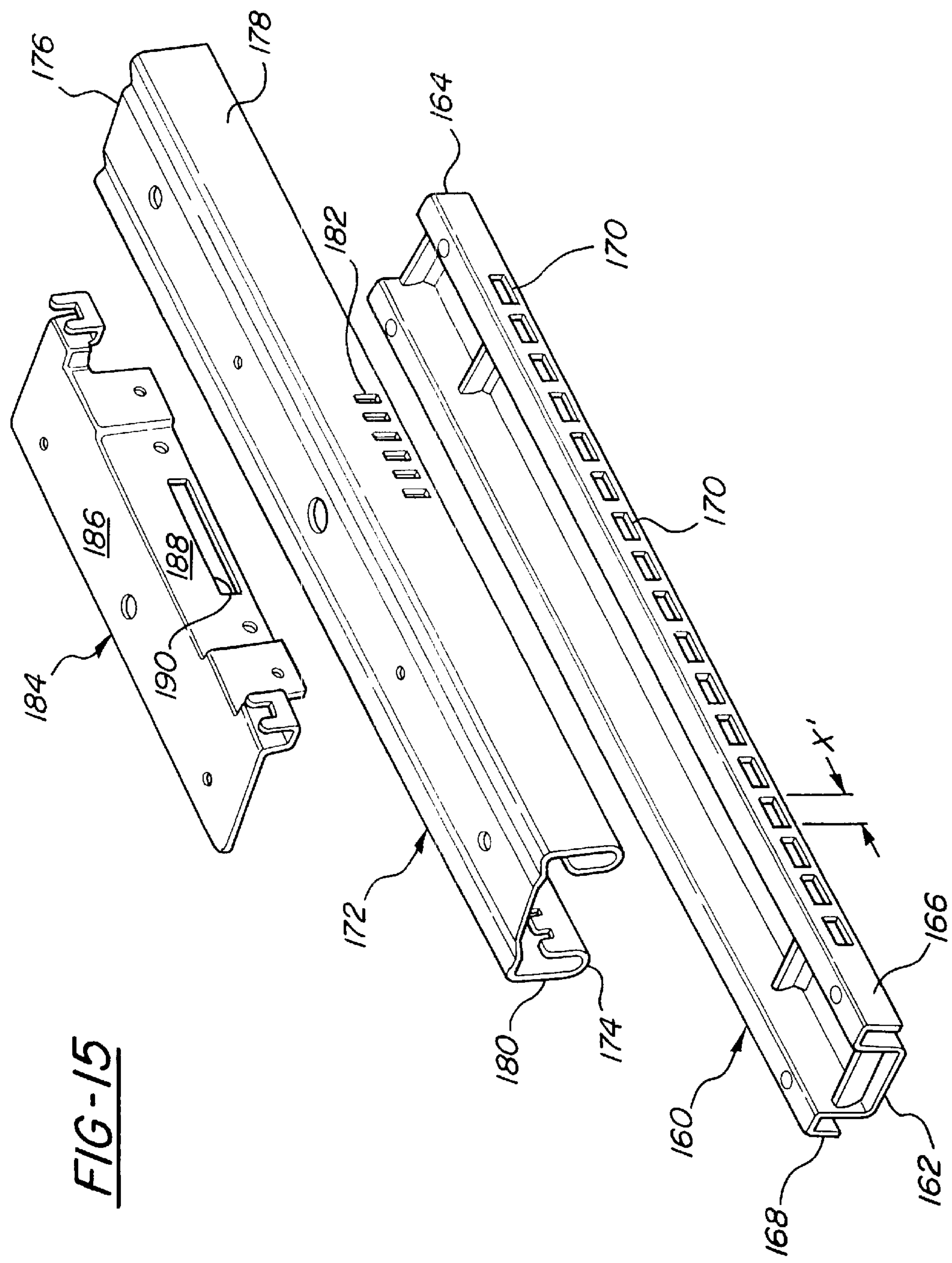
FIG. 15 is perspective view of an alternative embodiment of the upper and lower tracks and locking mechanism orientation.

Finally, FIG. 15 discloses an alternative upper and lower track configuration. The alternative embodiment of FIG. 15 includes a lower track 160 extending longitudinally between a first end 162 and a second end 164. The lower track 160 includes a pair of parallel side rails 166, 168 extending the longitudinal length of the track 160. A first plurality of spaced apart locking apertures 170 extend through the side rail 166 and form a longitudinal row of apertures 170 between the first end 162 and second end 164 of the lower track 160. An upper track 172 extends longitudinally between a first end 174 and a second end 176. The upper track 172 includes a pair of parallel side rails 178, 180 extending the longitudinal length of the track 172 for slidably engaging with the parallel side rails 166, 168 of the lower track 160. A second plurality of spaced apart locking apertures 182 extend through the side rail 178 and form a longitudinal row of apertures 182 partially between the first 174 and second 176 ends. The second row of apertures 182 are arranged to align laterally with the first row of apertures 170. An alternative moving lock plate 184 is fixedly secured to the upper track 172. The moving lock plate 184 includes a top mounting plate 186 for fixed securing the lock plate 184 to the top of the upper track 172 and a side mounting plate 188 extending downwardly and generally perpendicular from the top mounting plate 186. The side plate 188 may also be fixedly secured to the upper track 172. The side plate 188 includes a lateral slot 190 formed therethrough which overlaps with and provides an opening to the second row of apertures 182 in the side plate 178. It should be appreciated that the alternative configuration of the upper track 172, lower track 160 and moving lock plate 184 provide simply a different orientational alignment between the locking apertures 170 and row of apertures 182. That is, the side rail 166 of the lower track 160 forms the fixed lock plate of the preferred embodiment, only positioned vertically rather than horizontally as an integral part of the lower track 160. Similarly, the side rail 178 of the upper track 172 forms the upper locking plate and lower locking plate portions of the moving lock plate of the preferred embodiment, only also positioned vertically rather than horizontally to receive the side rail 166 therebetween and also form an integral part of the upper track 172. Finally, the housing 64 of the preferred embodiment may be attached to the side mounting plate 188 such that the channel 76 is aligned with the lateral slot 190. The plates 84, 86, 88 of the preferred embodiment are still slidably supported within the channel 76 of the housing and extend through the lateral slot 190 for cooperation and interlocking engagement with the apertures 170, 182 to interlock the upper track 172 relative to the lower track 160.

Figure 16:
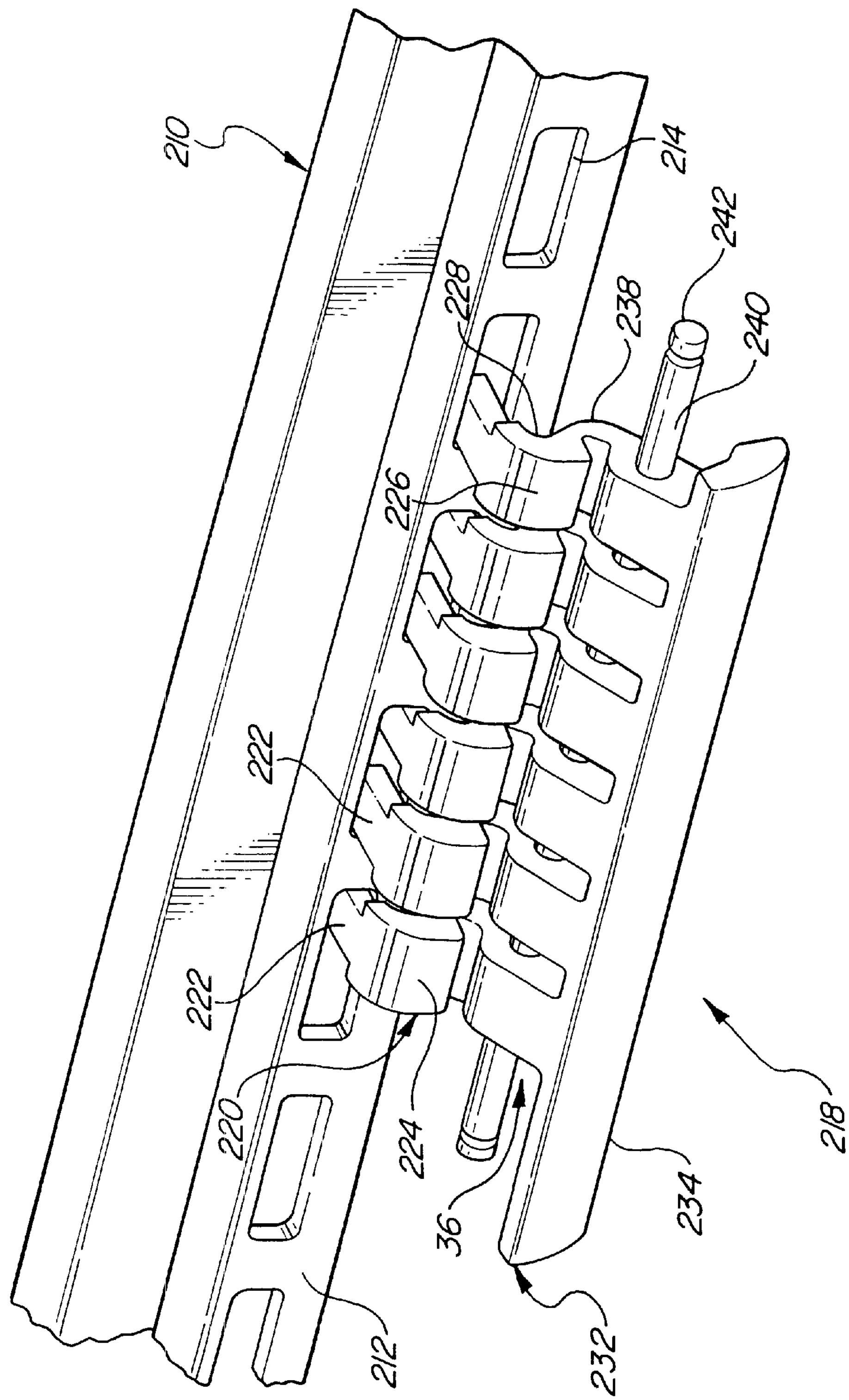
FIG. 16 is a perspective view of a lower seat track and a portion of a positive engagement latch according to another alternative embodiment of the invention.
Figure 17:
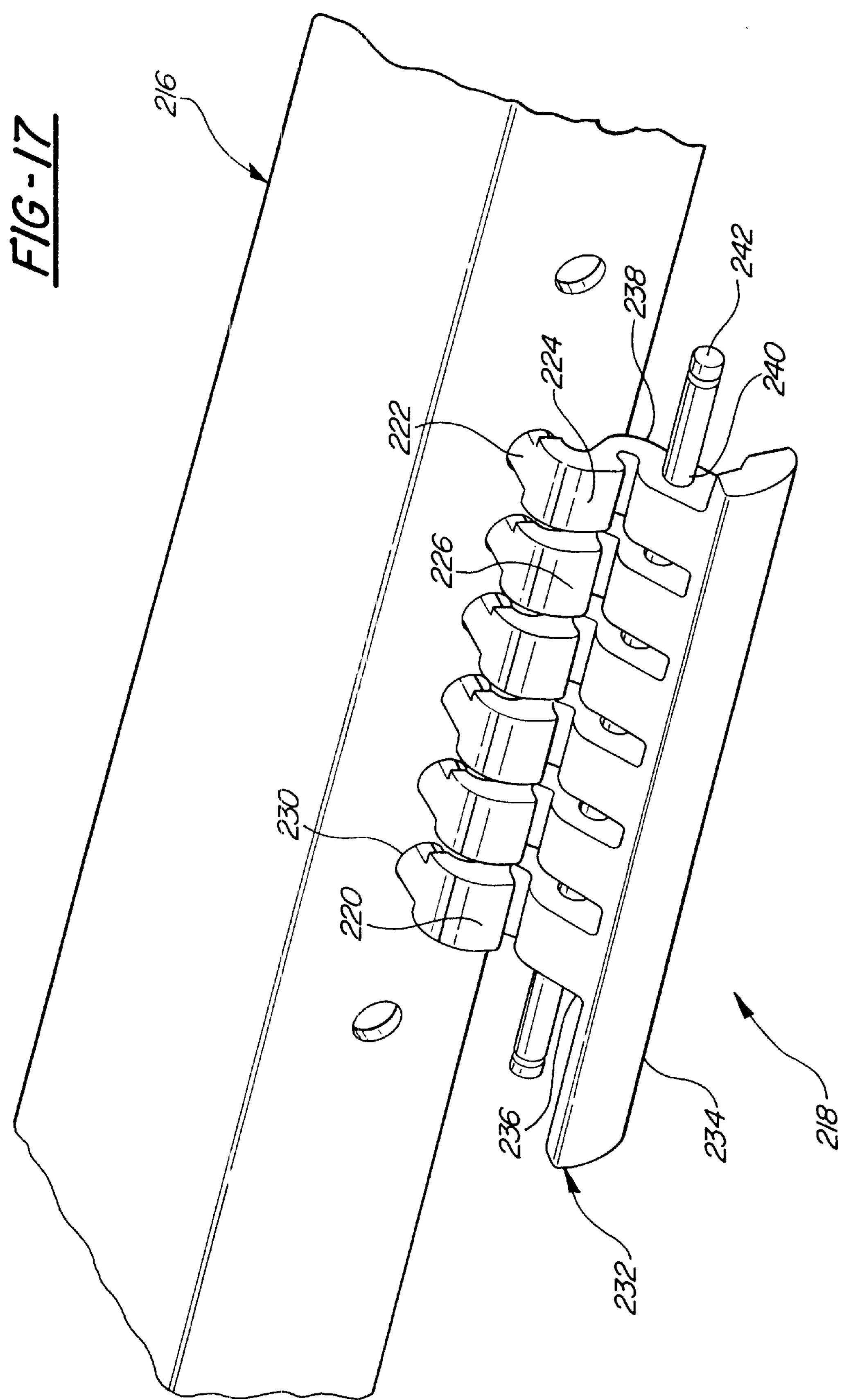
FIG. 17 is a perspective view of an upper seat track covering the lower seat track and the partial positive engagement latch cooperating therewith.

Referring to FIGS. 16–26, an alternative embodiment of the invention is shown including a positive engagement latch, or locking mechanism, for interlocking upper and lower seat tracks of a seat assembly for use in an automotive vehicle. The seat assembly typically includes a seat back pivotally coupled to a seat cushion. The seat cushion is fixedly secured to a pair of spaced apart and parallel upper seat tracks. The upper seat tracks are slidably coupled to a respective pair of spaced apart and parallel lower seat tracks for providing fore and aft sliding adjustment of the seat assembly within the vehicle. The lower seat tracks are fixedly secured to the floor of the vehicle for fixedly mounting and securing the seat assembly within the vehicle. Referring to FIG. 16, a longitudinally extending lower seat track according to the preferred embodiment is generally shown at 210. The lower seat track 210 includes a generally U-shaped cross-section having an inboard rail portion 212. The inboard rail portion 212 includes a plurality of generally rectangular, spaced apart apertures 214 passing therethrough along the longitudinal length of the track 210. Referring to FIG. 17, a longitudinally extending upper seat track is generally shown at 216. The upper seat track 216 also includes a generally U-shaped cross-section for mating with the lower seat track 210 and allowing the upper track 216 to slide longitudinally along the lower track 210 as is commonly known in the art.

Referring to FIGS. 16 and 17, a portion of the positive engagement latch, or locking mechanism is generally shown at 218. The positive engagement latch 218 is operatively coupled between the upper track 216 and the lower track 210 for interlocking the tracks 210, 216 and preventing fore and aft sliding movement therebetween. The positive engagement latch 218 includes a plurality of independent and spaced apart locking fingers 220. Each of the locking fingers 220 include a distal projection portion 222 and an opposite proximal cam portion 224. The locking fingers 220 are arranged generally transverse to the longitudinal length of the upper and lower tracks 216, 210 such that the projection portions 222 are aligned to be received with one of the apertures 214 in the lower track 210. More specifically, the width of the projection portions 222 is generally half of the width of the apertures 214 such that one or two adjacent projection portions 222 of the locking fingers 220 may be received within one of the apertures 214. The fingers 220 are spaced apart generally the same distance as the spacing between the spaced apart apertures 214 in the lower track 210 such that the fingers 220 may also be straddled therebetween. The cam portion 224 is defined by a generally C-shaped portion having an outer abutment surface 226 facing away from the inboard rail portion 212 of the lower track 210 and an inner cam surface 228 facing toward the inboard rail portion 212. The projection portions 222 of each of the locking fingers 220 project through corresponding openings 230 in the upper track 216 and into one of the apertures 214 in the lower track 210.

The positive engagement latch 218 further includes an actuator 232 for actuating the locking fingers 220 between a locked position received within one of the apertures 214 of the lower track 210 and an unlocked position removed from the apertures 214 of the lower track 210. The actuator 232 includes a longitudinally extending base portion 234 and a plurality of cam fingers 236 spaced apart and parallel along the longitudinal length of the base portion 234, with each in corresponding mating engagement with a respective one of the plurality of locking fingers 220. Each of the cam fingers 236 includes a C-shaped cam hook 238 interlocked with the respective cam surface 228 of the locking finger 220. Each cam finger 236 further includes an aperture 240 passing therethrough for receiving a cylindrical pivot rod 242 therethrough.

Figure 18:
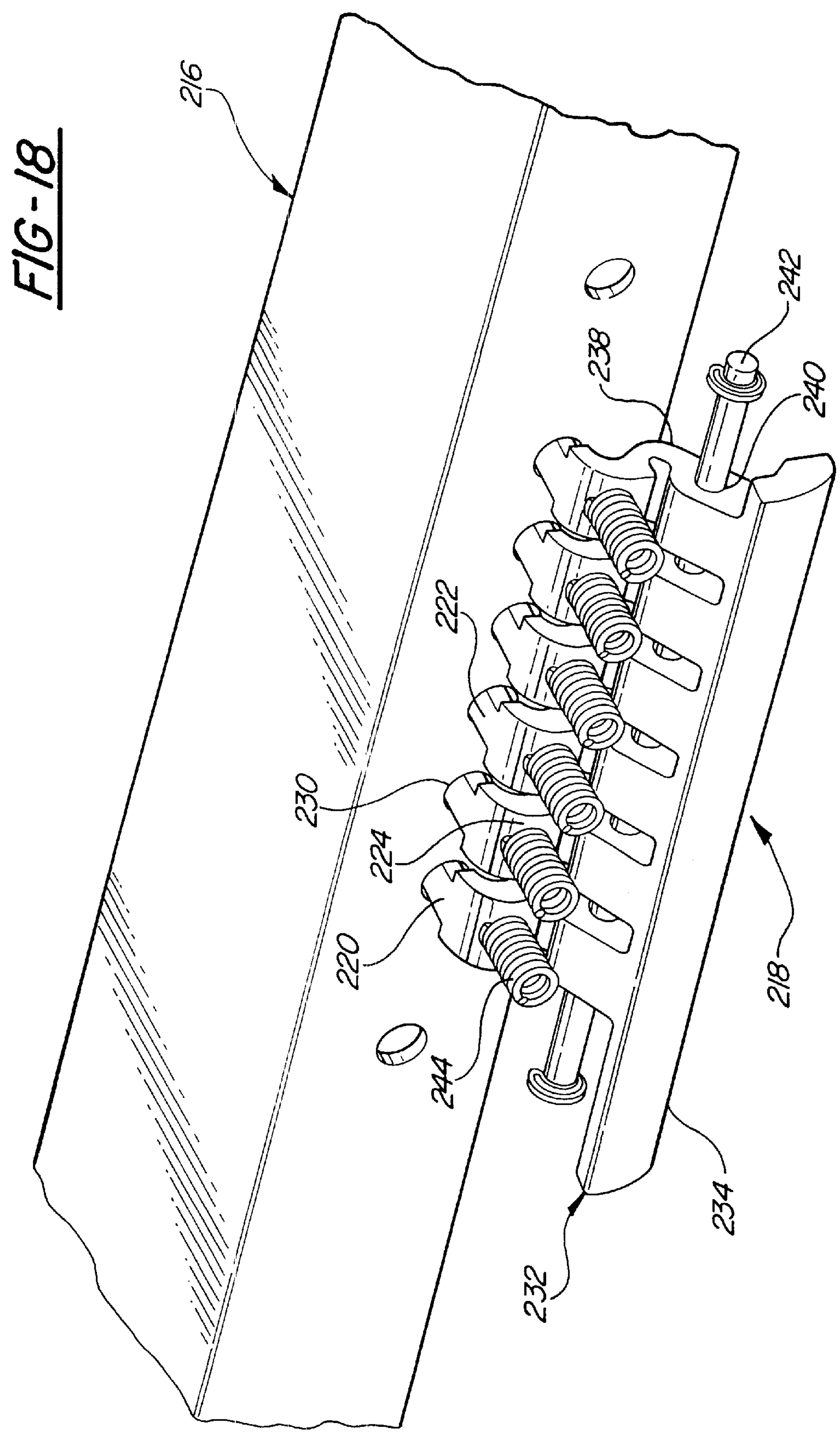
FIG. 18 is a perspective view of biasing members of the positive engagement latch for biasing the latch to a locked position.
Figure 19:
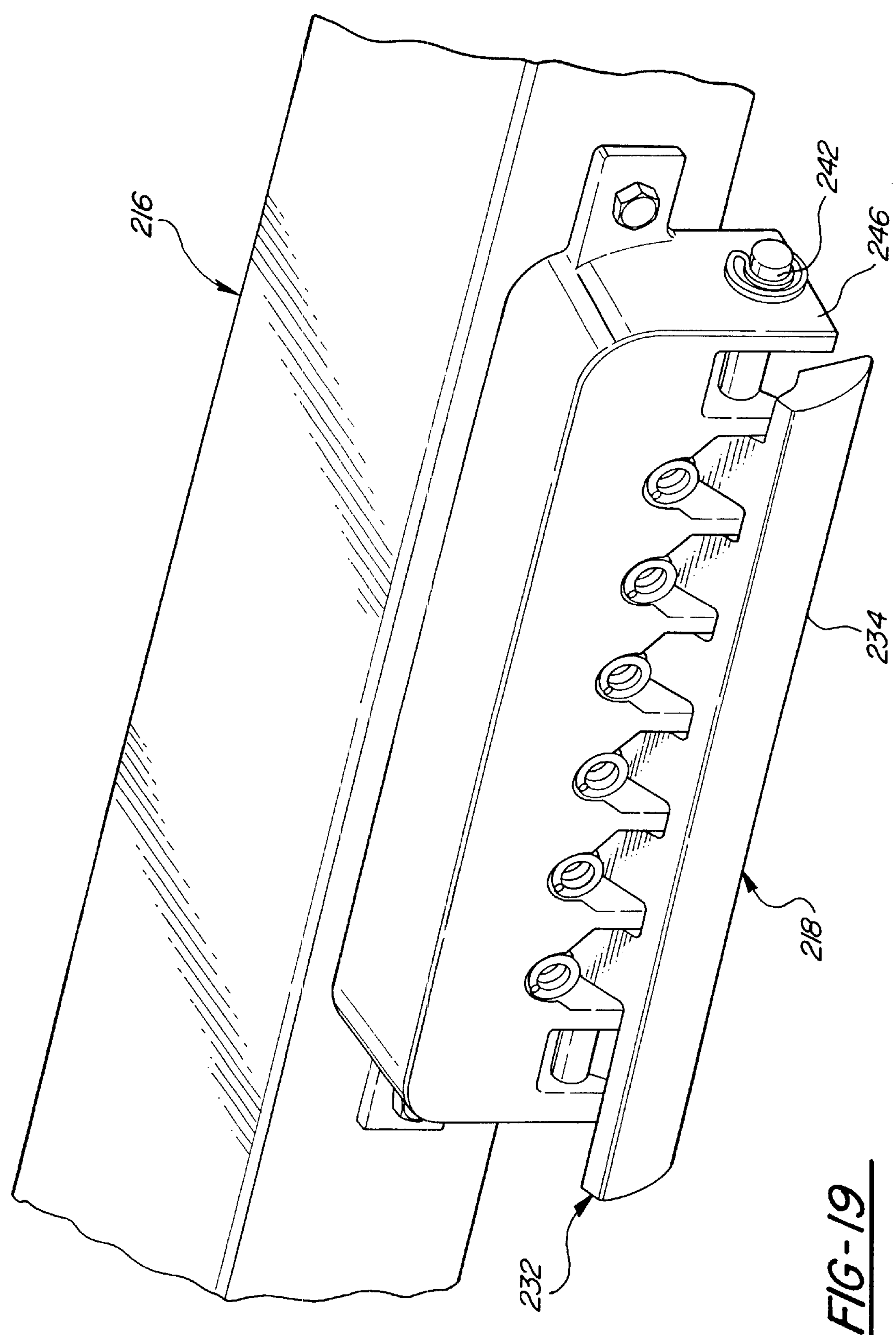
FIG. 19 is a perspective view of a housing of the positive engagement latch for mounting the latch to the upper seat track.
Figure 20:
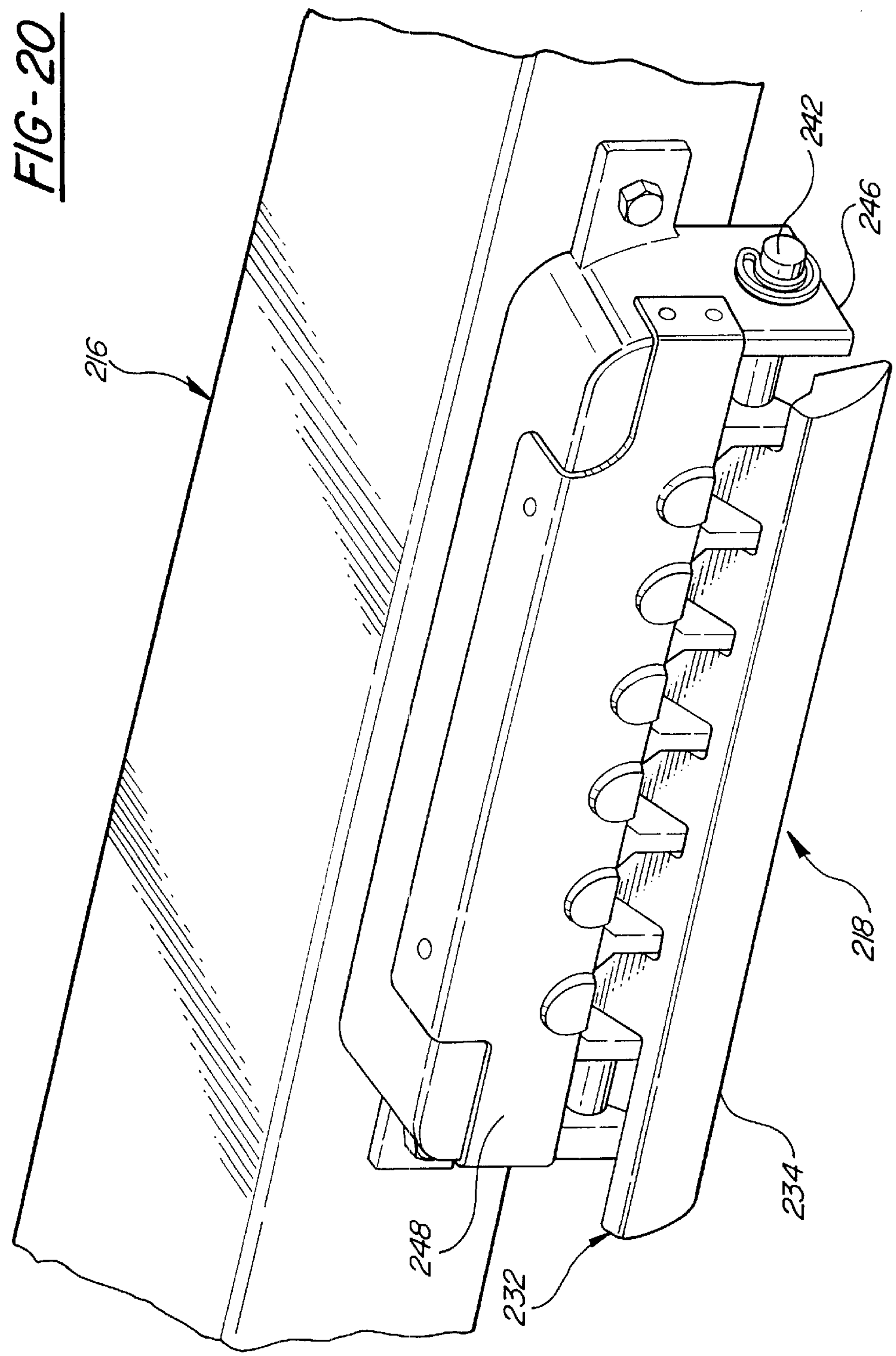
FIG. 20 is a perspective view of a cover for closing the positive engagement latch.

Referring to FIG. 18, the latch 218 further includes a plurality of coil springs 244 associated with each of the locking fingers 220. A first end of the coil springs 244 is engaged with one of the outer abutment surfaces 226 of a respective locking finger 220. Referring to FIG. 19, the latch 218 also includes a generally rectangular support housing 246 covering each of the locking fingers 220 and springs 244. The support housing 246 fixedly secures the latch 218 to the upper track 216. Further, the opposing ends of the pivot rod 242 are supported by opposite end walls of the housing 246. Referring to FIG. 19, a cover plate 248 covers a front portion of the support housing 246 and the second ends of the springs 244.

In operation, a release handle or lever may be operatively coupled to the base portion 234 of the actuator 232. In a locked position, the actuator 232 is rotated about the pivot rod 242 in the clockwise direction by the springs 244. The springs 244 are compressed between the cover plate 248 and the abutment surface 226 of the respective locking fingers 220 to urge the locking fingers 220 toward the inboard rail portion 212 of the track 210. The projection portions 222 of the fingers 220 are forced into one of the aligned apertures 214 in the lower track 210 to prevent fore and aft relative sliding movement between the upper track 216 and lower track 210. The preferred embodiment discloses six locking fingers 220 such that at least three of the six fingers 220 are automatically received within at least one or more of the apertures 214 in the lower track 210. That is, if the other fingers 220 are not sufficiently aligned to be received with the apertures 214, at least three of the six fingers 220 will align due to the predetermined spacing of the apertures 214 and fingers 220.

To release the tracks 210, 216 and allow relative fore and aft sliding adjustment therebetween, the actuator 232 is rotated about the pivot rod 242 in the counterclockwise direction against the biasing force of the coil springs 244. The cam hooks 238 of the cam fingers 236 which are engaged with the inner cam surface 228 of the fingers 220 pull the fingers 220 away from the lower track 210 to remove each of the fingers 220 from the apertures 214 in the lower track 210. However, the fingers 220 are retained and guided within the respective openings 230 in the upper track 216. The latch 218, therefore, travels with the upper track 216 upon sliding fore and aft movement thereof relative to the lower track 210. When the actuator 232 is released and returned to the locked position, at least three of the six fingers 220 are received within one or more of the apertures 214 in the lower track 210 to interlock the upper track 216 and lower track 210 as described above. Thus, the latch 218 provides a positive engagement latch between the upper track 216 and lower track 210 in any position of fore and aft sliding adjustment therebetween.

Figures 21, 22:
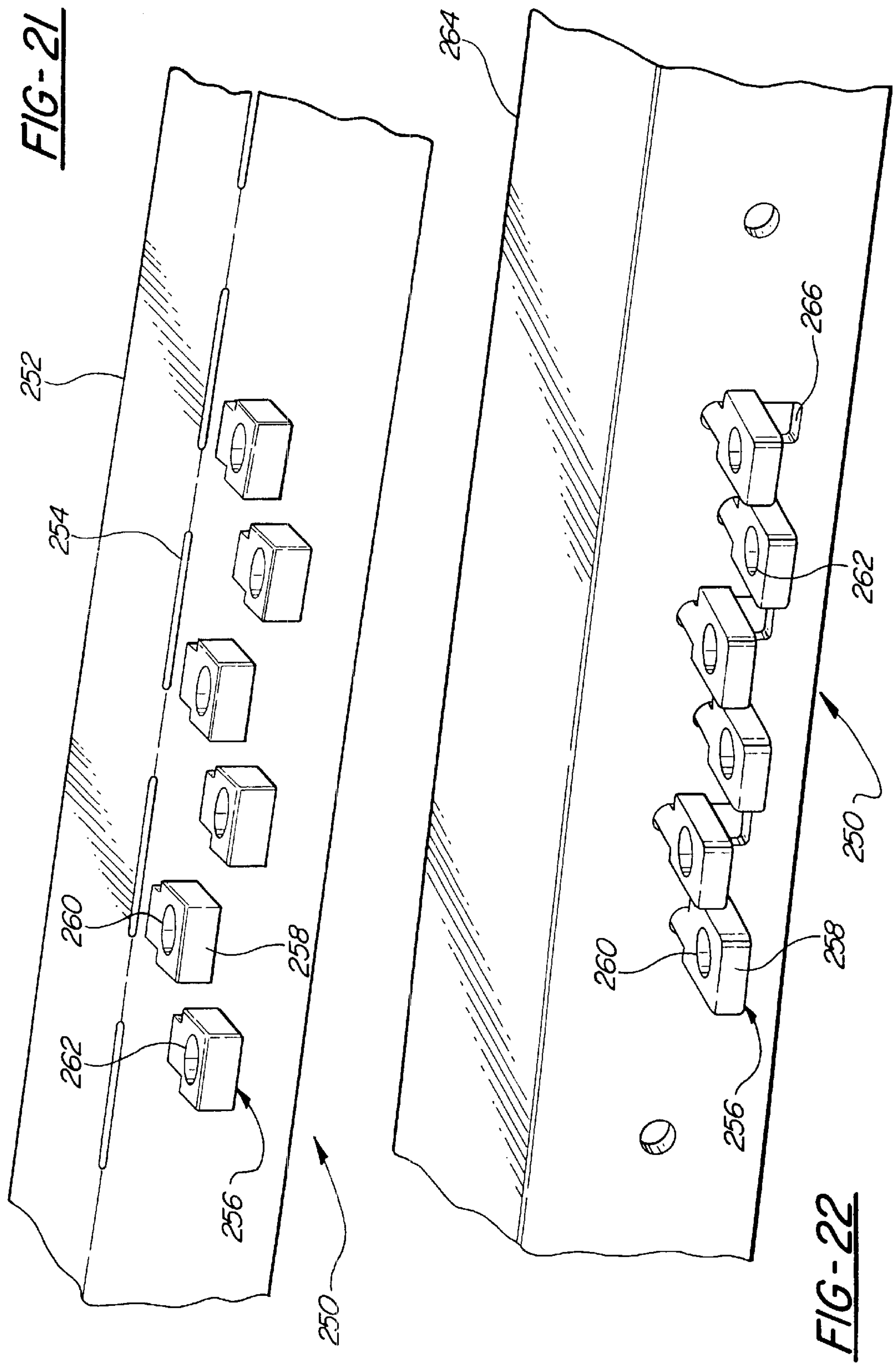
FIG. 21 is a perspective view of an alternative lower seat track and a portion of an alternative positive engagement latch.
FIG. 22 is a perspective view of an upper seat track covering the lower seat track of FIG. 21.

Referring to FIGS. 21–26, an alternative embodiment of the positive engagement latch, or locking mechanism, is generally shown at 250. Referring to FIG. 21, a lower track 252 extends longitudinally for securing the seat assembly to the vehicle floor. The lower track 252 includes a plurality of spaced apart slots, or notches, 254 extending the longitudinal length thereof. The positive engagement latch 250 includes a plurality of spaced apart locking fingers 256 having a base portion 258 and a projecting tab portion 260 to be received within one of the slots 254 of the lower track 252. The base portion 258 includes a bore 262 passing therethrough. Referring to FIG. 22, an upper track 264 extends longitudinally along and in sliding engagement with the lower track 252 for providing fore and aft sliding adjustment of the seat assembly. The upper track 264 includes a plurality of side slots 266 for receiving and supporting the tab portion 260 of the locking fingers 256 and for aligning with one or more of the slots 254 in the lower track 252.

Figure 23:
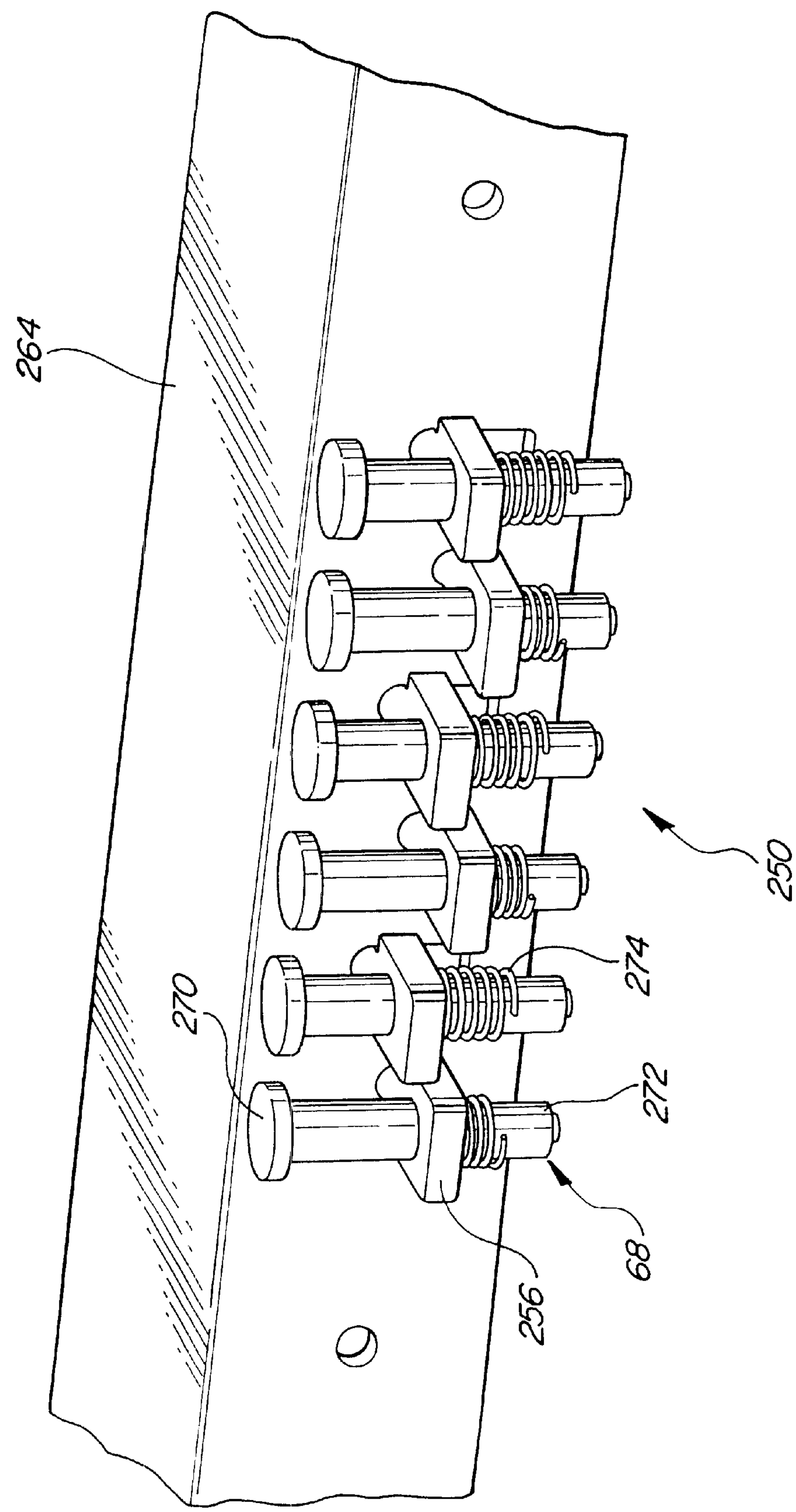
FIG. 23 is a perspective view of guide pins and biasing members of the alternative positive engagement latch for biasing the latch in the locked position.
Figure 24:
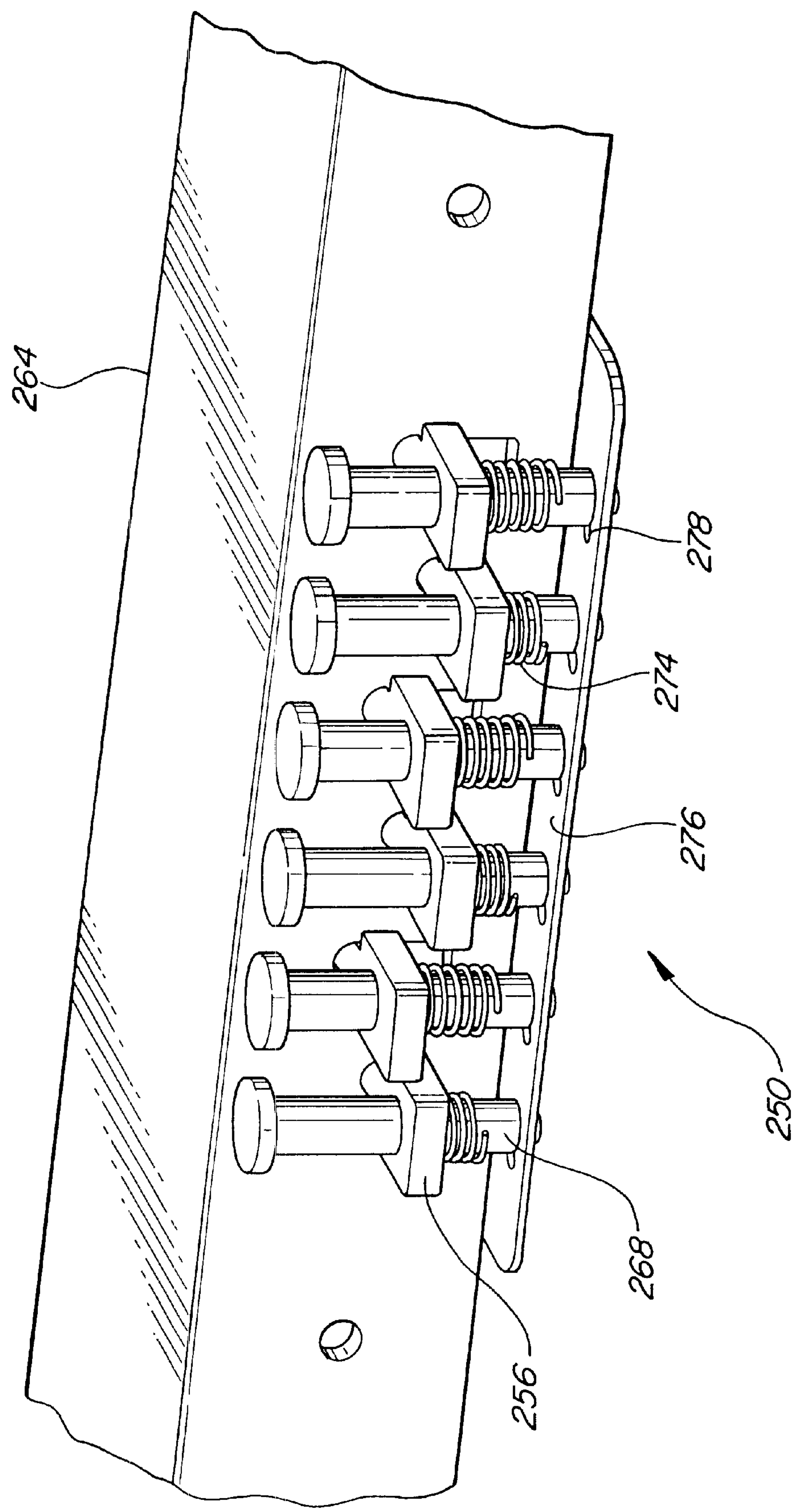
FIG. 24 is a perspective view of a support cage for supporting the guide pins of the alternative positive engagement latch.

Referring to FIG. 23, the latch 250 further includes a plurality of guide pins 268 passing through the bore 262 of a respective locking finger 256. Each guide pin 268 includes a head portion 270 and a distal end 272. A coil spring 274 is positioned about each of the pins 268 between the distal end 272 and the base portion 258 of the respective locking finger 256 for biasing the fingers 256 upwardly into one of the slots 254 of the lower track 252. Referring to FIG. 24, a cage 276 including a plurality of apertures 278 therethrough receive and support the distal ends 272 of each of the locking fingers 256.

Figure 25:
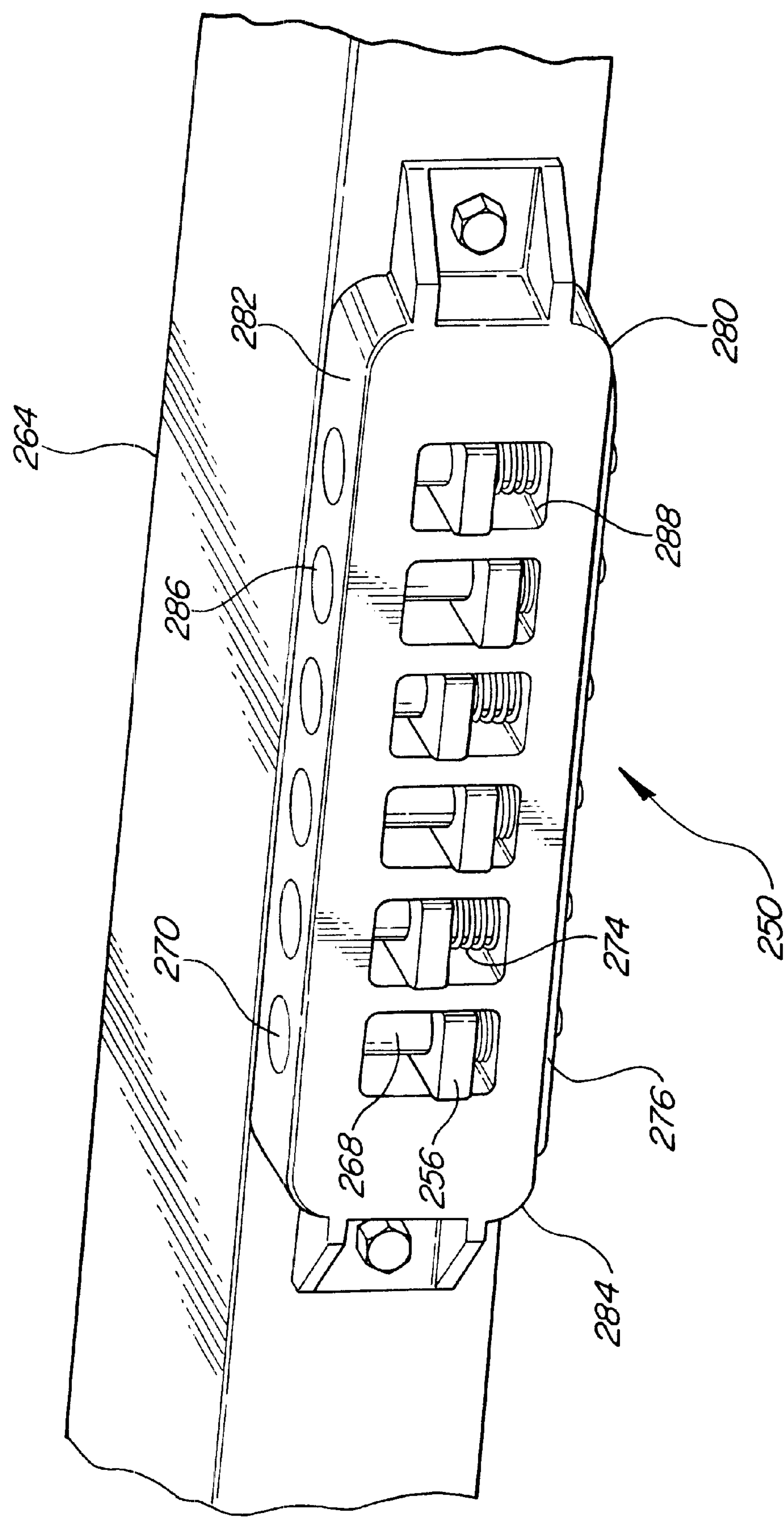
FIG. 25 is a perspective view of a housing of the alternative positive engagement latch for mounting the latch to the upper seat track.

Referring to FIG. 25, the positive engagement latch 250 further includes a support housing 280 for fixedly securing the latch 250 to the upper track 264. The support housing 280 is generally rectangular and includes upper 282 and lower 284 walls having bores 286 passing therethrough. The guide pins 268 extend through a respective bore 286 and are supported between the upper and lower walls 282, 284. The support housing 280 further includes a plurality of generally rectangular windows 288 between the upper and lower walls 282, 284 for receiving and guiding the base portion 258 of a respective locking finger 256 therein between the upper and lower walls 282, 284. The springs 274 are compressed between the base portion 258 of the locking fingers 256 and the lower wall 284 of the housing 280 to bias the locking fingers 256 upwardly toward the upper wall 282 of the housing 280.

Figure 26:
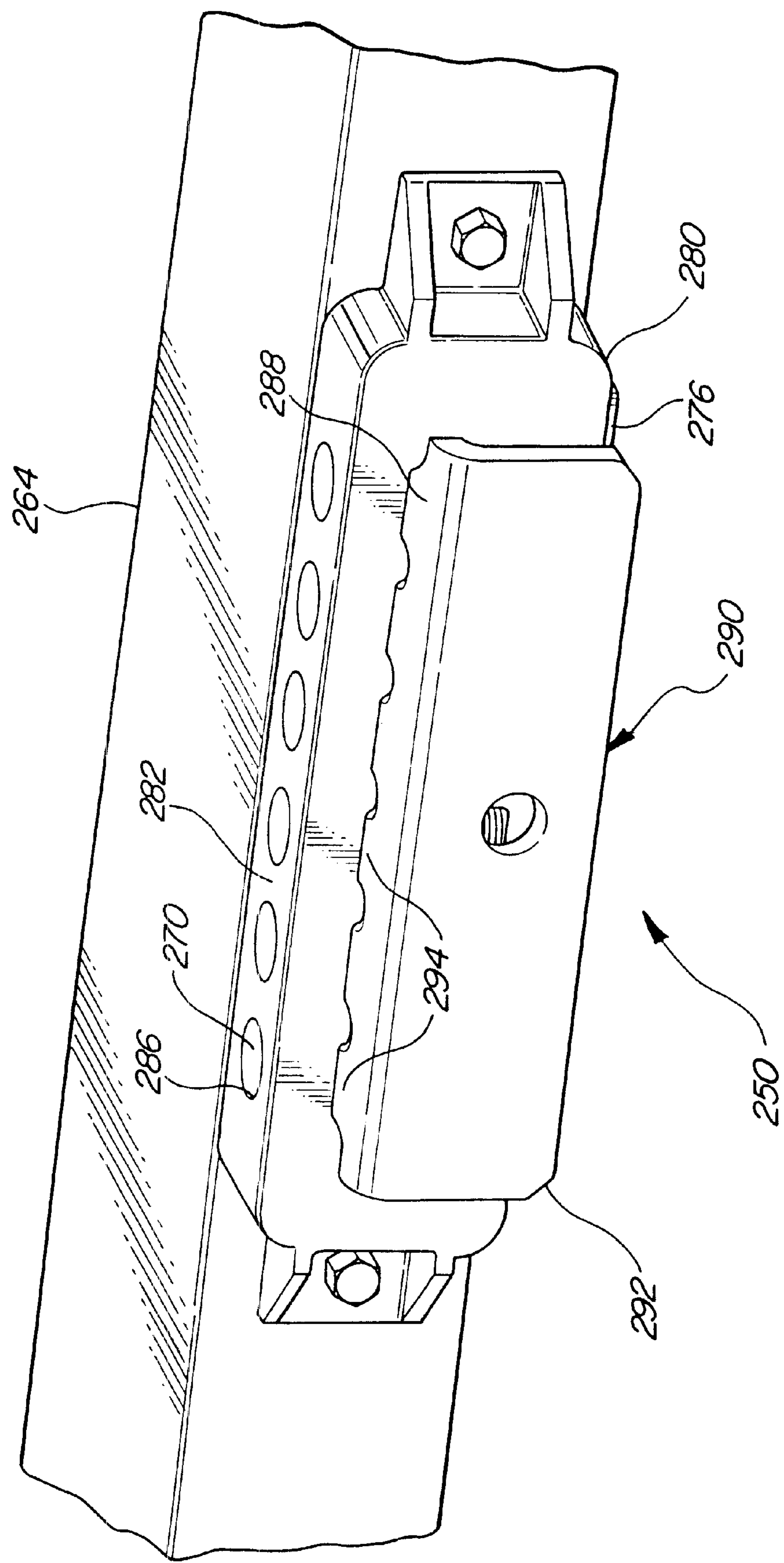
FIG. 26 is perspective view of an actuator for actuating the latch between a locked and unlocked position.

Finally, referring to FIG. 26, an actuator 290 is operatively coupled to the housing 280 for locking and unlocking the latch 256. The actuator 290 includes a base plate 292 covering the housing 280 and the windows 288 in the housing 280. A plurality of actuating fingers 294 project outwardly from the base plate 292 into one of the respective windows 288 and seated above the base portion 258 of the respective locking finger 256.

In operation, a handle or lever may be connected to the base plate 292 of the actuator 290 for actuating the latch 256 between a locked condition and an unlocked condition. To unlock the latch 256 and provide fore and aft sliding movement between the upper track 264 and lower track 252, the actuator 290 is forced downwardly with respect to the housing 280. Each of the actuating fingers 294 engage the base portion 258 of the respective locking finger 256 seated within the window 288 to force each of the locking fingers 256 downwardly along the guide pins 268 and against the compressed biasing force of the springs 274. As the locking fingers 256 slide downwardly, the tab portions 260 are guided along the slots 266 in the upper track 264 and removed from the slots 254 in the lower track 252. The upper track 264 is thus unlocked from the lower track 252 and free to slide therealong both fore and aft to adjust the position of the seat assembly.

To lock the upper track 264 and lower track 252 and prevent relative fore and aft sliding movement therebetween, the actuator 290 is released to return the latch 256 to the locked condition. The springs 274 force the locking fingers 256 to slide upwardly along the guide pins 268 toward the upper wall 282 of the housing 280. The locking fingers 256 further lift the actuating fingers 294 upwardly within the windows 288 toward the upper wall 282. The tab portions of the locking fingers 256 are guided by the slots 266 in the upper track 264 and received in one or more of the slots 254 in the lower track 252. The locking fingers 256 pass through both the slots 266 in the upper track 264 and the slots 254 in the lower track 252 to interlock and prevent sliding movement therebetween. Again, the embodiment disclosed six locking fingers 256 equally spaced apart and dimensioned such that one or two of the fingers 256 may be received within one of the slots 254 in the lower track 252 such that at least three of the locking fingers 256 are engaged within the slots 254 in the locked condition. It should be appreciated that other numbers of the locking fingers 256 may be utilized as desired.

Referring now to FIGS. 27–38, yet another alternative embodiment of a seat track assembly and positive engagement latch is shown. The seat track assembly 300 again includes a longitudinally extending upper track 302 slidably coupled to a longitudinally extending lower track 304. The positive engagement latch 306 is fixedly secured to the inboard side of the upper track 302 for selectively preventing fore and aft sliding movement between the upper track 302 and lower track 304.

Figure 38:
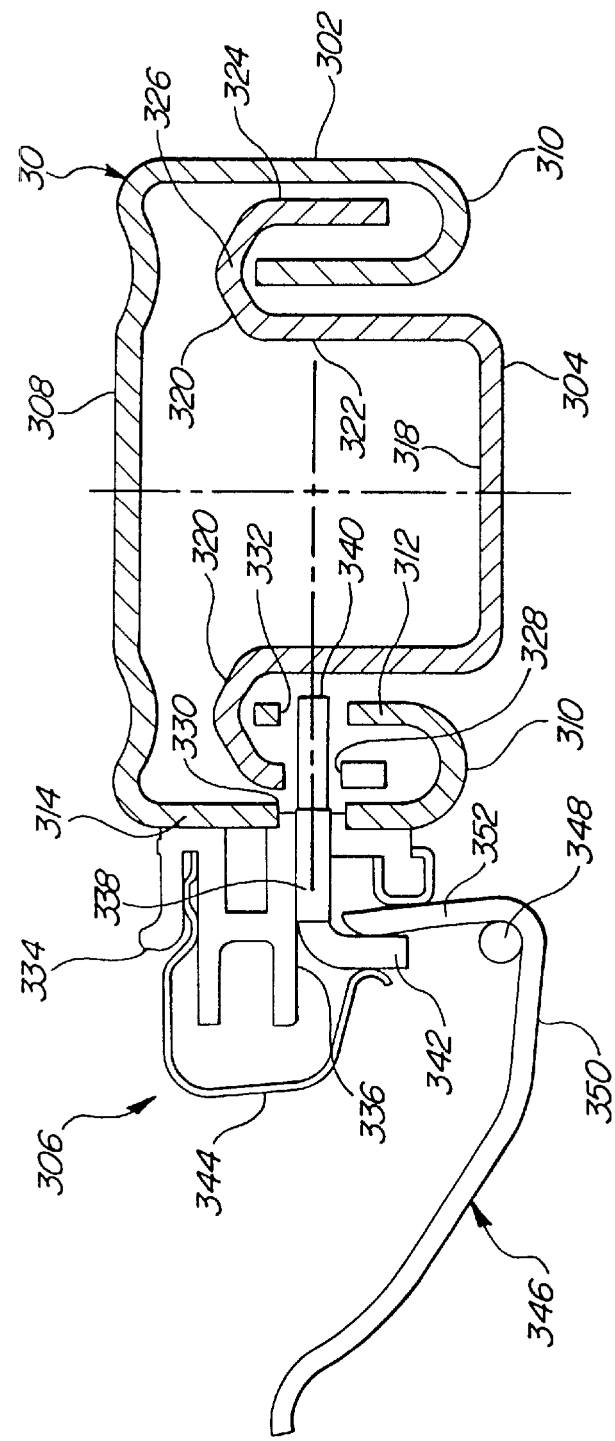
FIG. 38 is an end view of the positive engagement latch and seat track assembly.

Referring specifically to FIG. 38, the upper track 302 has a generally U-shaped cross-section and comprises a top mounting plate 308 and spaced apart side rails 310. The side rails 310 are formed by spaced apart and parallel inner and outer guide rails 312, 314 joined by a C-shaped portion 316 forming a guide channel therebetween. The lower track 304 also has a generally U-shaped cross-section and comprises a bottom plate 318 and spaced apart side rails 320. The side rails 320 are formed by spaced apart and parallel inner and outer guide rails 322, 324 joined by a C-shaped portion 326 forming a guide channel therebetween. The upper and lower tracks 302, 304 are slidably interlocked by the inserting the outer guide rails 324 of the lower track 304 between the guide rails 312, 314 of the upper track 302 and similarly inserting the inner guide rails 312 of the upper tracks 302 between the guide rails 322, 324 of the lower track 304.

The outer guide rail 324 of the lower track 304 includes a plurality of equally spaced apart apertures 328 extending therethrough and spaced along the longitudinal length thereof. Additionally, both the inner and outer guide rails 312, 314 of the upper track 302 include a plurality of laterally aligned and equally spaced apart apertures 330, 332 extending therethrough and spaced along the longitudinal length thereof. The track assembly 300 is substantially similar to the track assembly 172 of FIG. 15.

Figure 28:
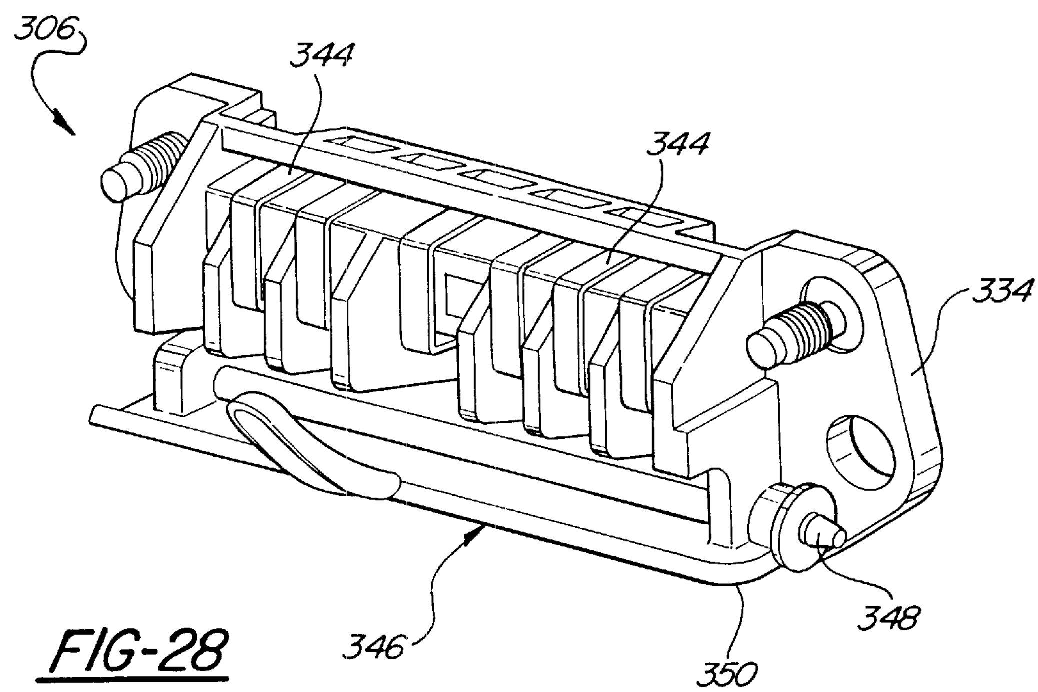
FIG. 28 is a front perspective view of the positive engagement latch of FIG. 27.
Figure 29:
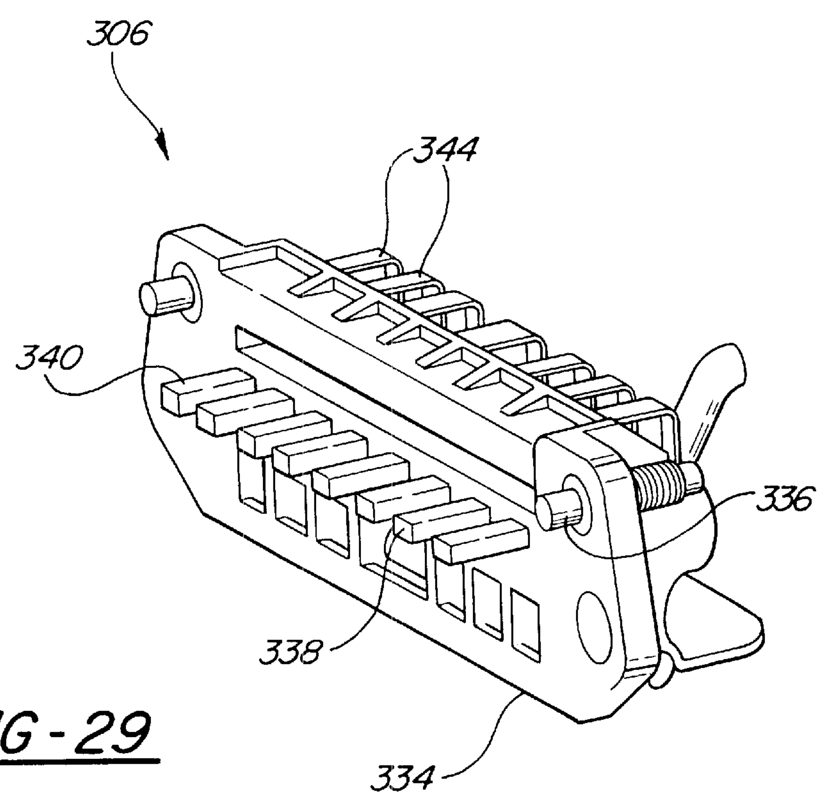
FIG. 29 is a rear perspective view of the positive engagement latch.

Referring to FIGS. 28, 29 and 38, the positive engagement latch 306 includes a support housing 334 for fixedly securing the latch 306 to the upper track 302. The housing 334 has a plurality of equally spaced apart openings 336 therein for alignment with the apertures 330 in the guide rail 314 of the upper track 302. A locking finger 338 is slidably received and supported in each of the openings 336. Each of the locking fingers 338 includes a distal projection portion 340 and a proximal cam portion 342 forming a generally L-shaped finger 338. The positive engagement latch 306 also includes a plurality of clip type biasing spring elements 344, one anchored between the housing 334 and each of the outer surface of the cam portion 342 for biasing the locking fingers 338 through their respective openings 336 in the housing 334. A actuator 346 is pivotally coupled to the housing 334 by a cylindrical pivot rod 348 for actuating the locking fingers 338 between a locked position and an unlocked position as will be described in detail hereinbelow. The actuator 346 includes a base portion 350 and a plurality of cam fingers 352 spaced apart and parallel along the longitudinal length of the base portion 350, with each in corresponding mating engagement with a respective one of the plurality of locking fingers 338. Specifically, the cam fingers 352 are seated between the cam portion 342 of the locking fingers 338 and the housing 334 for sliding the locking fingers 338 away from the openings 336 and against the biasing force of the spring elements 344 upon pivotal movement of the actuator 346 about the pivot rod 348.

Figure 27:
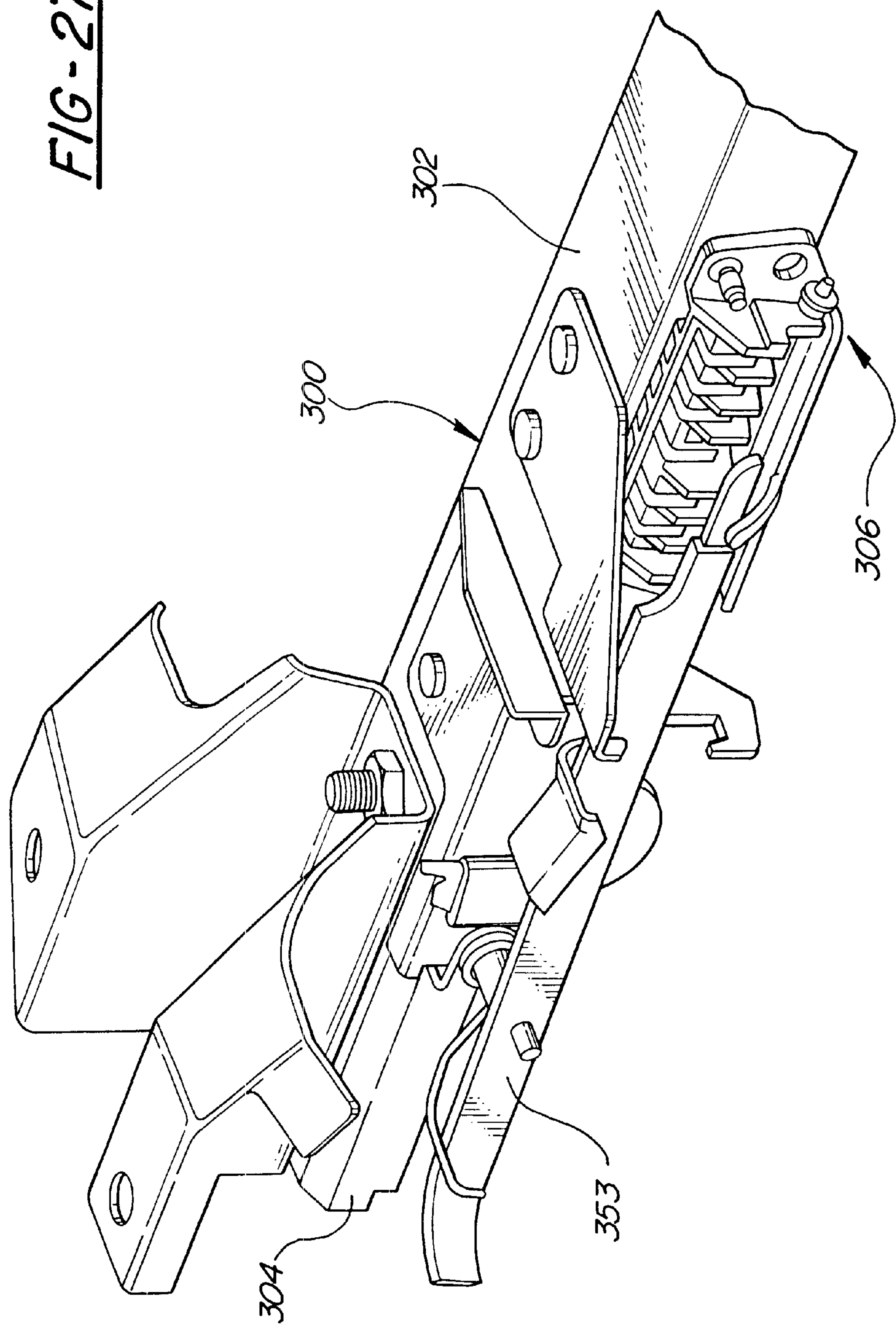
FIG. 27 is a perspective view of yet another alternative embodiment of a track assembly and positive engagement latch.

In operation, a release handle or lever 353 is operatively coupled to the base portion 350 of the actuator 346, as shown in FIG. 27, for actuating the positive engagement latch 306. Referring to FIGS. 30–33, in a fully locked position or condition, the actuator 346 is biased about the pivot rod 348, in the clockwise direction as shown, by the force of the spring elements 344 acting on the locking fingers 338 and cam fingers 352. The spring elements 344 force each of the locking fingers 338 through the respective openings 336 in the housing and into both aligned apertures 330, 332 in the upper track 302 as well as the apertures 328 in the lower track 304 to prevent fore and aft relative sliding movement therebetween. Again, the preferred embodiment discloses six locking fingers 338 of equal spacing such that at least three of the six fingers 338 are automatically received within at least one or more of the apertures 328 in the lower track 304 regardless of the relative position between the upper track 302 and lower track 304. The spacing of the fingers 338 is arranged such that either two adjacent fingers 338 are received within one aperture 328 or the adjacent fingers 338 are received in adjacent apertures 328 and straddle the land or portion of the track rail 324 therebetween.

Figure 39:
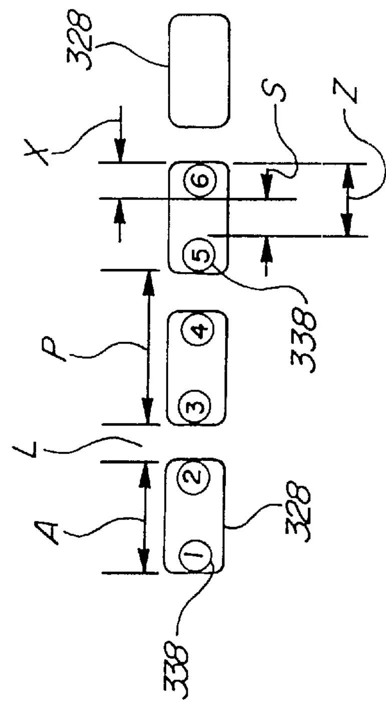
FIG. 39 is a schematic view of the spaced relationship between the locking fingers and apertures.

Specifically, referring to FIG. 39, the spacing and relationship between the locking fingers 338 and apertures 328 of the lower track 304 is shown. The locking fingers 338 are labelled 1–6. The critical dimensions of the apertures 328 are as follows: the width of the apertures 328 in the guide rail 324 of the lower track is dimension a; the width of the land or portion between each adjacent pair of apertures 328 is dimension L; and the distance from the front edge of one aperture 328 to the next adjacent aperture 328 is dimension P. The critical dimensions of the locking fingers 338 is as follows: the width of each locking finger 338 is dimension X; the distance between adjacent locking fingers 338 is dimension S; and the distance from the trailing edge of one locking finger 338 to the trailing edge of the next adjacent locking finger 338 is dimension Z. To ensure that at least three of the six locking fingers 338 will engage with the apertures 328 of the lower track 304 in any position, the following equations apply:

Equation 1: $a=Z+X$; such that two locking fingers 338 fit within one aperture 328;

Equation 2: $a=X+P-Z$; such that adjacent locking fingers 338 may straddle the land between adjacent apertures 328; and Equation 3: $a>X+P/2$; such that at least three locking fingers 338 engage apertures 328 in any relative position between the upper and lower tracks 302, 304.

In the preferred embodiment the values for the above dimensions is as follows:

a=15 mm

X=4.85 mm

Z=10 mm

P=20 mm

Figures 30, 31:
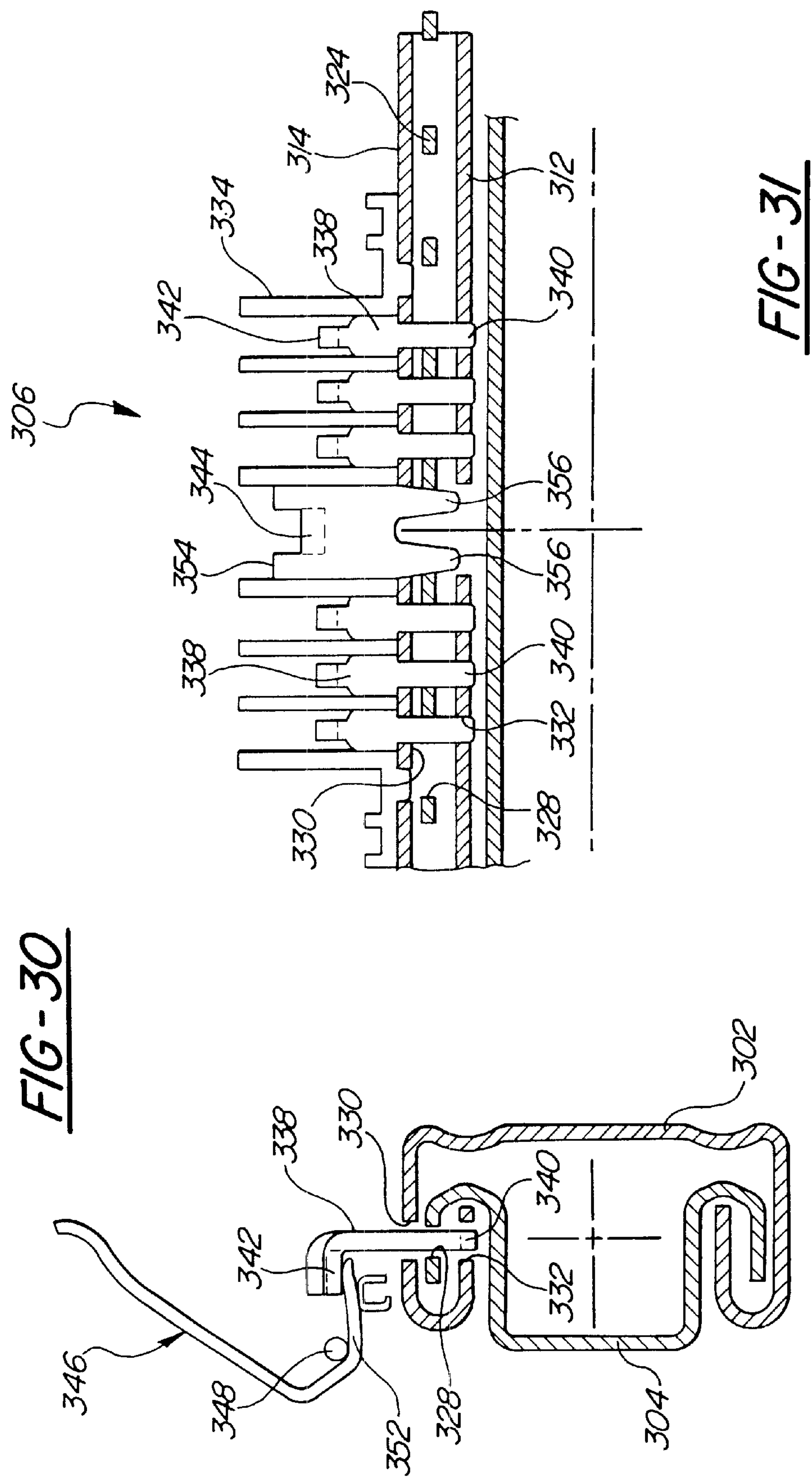
FIG. 30 is an end view of the positive engagement latch in a first locked condition.
FIG. 31 is a side cross sectional view of FIG. 30.
Figure 33:
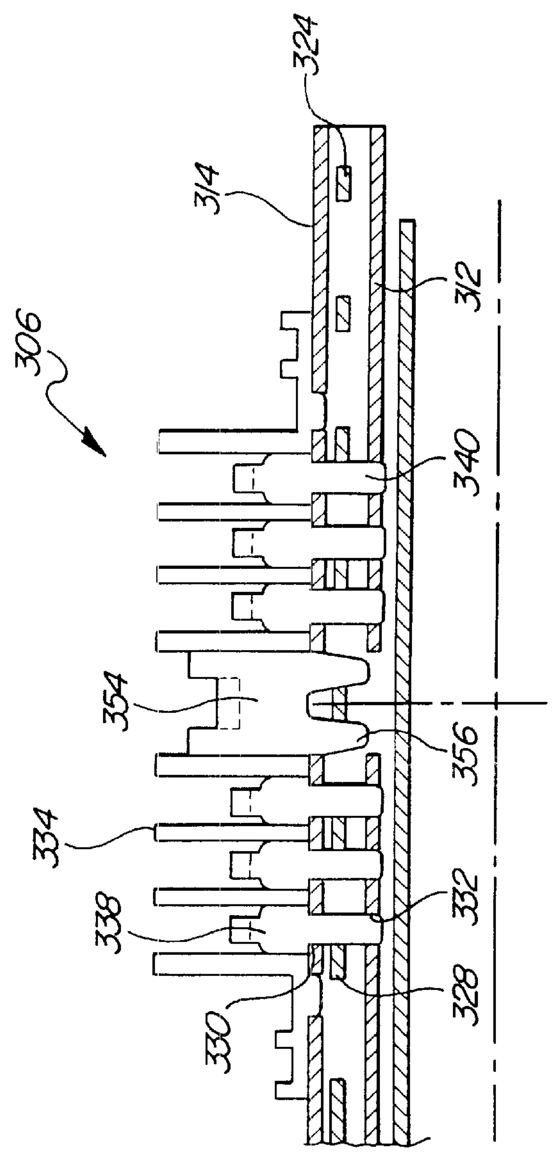
FIG. 33 is a side cross sectional view of FIG. 32.
Figure 32:
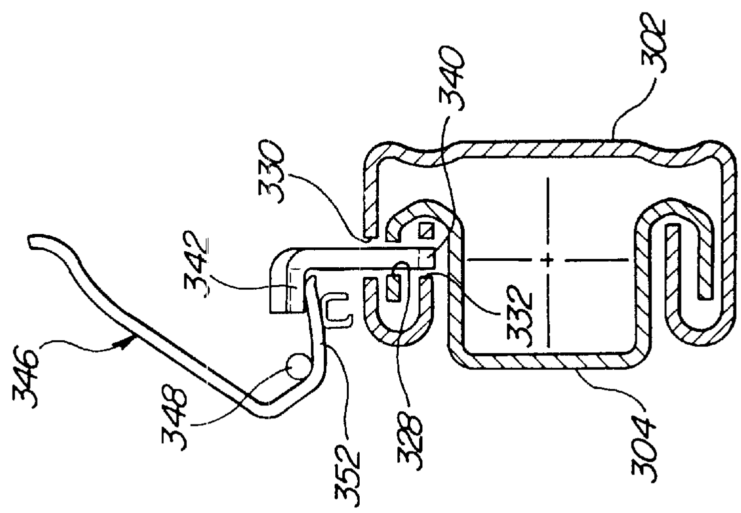
FIG. 32 is an end view of the positive engagement latch in a second locked condition.

The positive engagement latch 306 further includes an anti-chuck wedge plate 354 having a pair of spaced apart wedge fingers 356 with tapered side edges. The fingers 356 are spaced equally apart with the same spacing as between the locking fingers 338. As shown in FIGS. 31 and 33, in the fully locked position, the wedge fingers 356 are either both received within a single aperture 328 in the lower track 304 or straddle the land between adjacent apertures 328. The tapered side edges of the wedge fingers 356 force the fingers 356 to be frictionally wedged between the side edges of the apertures 328 in the lower track and the apertures 330 in the outer guide rail 314 of the upper track 302 to prevent chuck or rattle between the upper and lower tracks 302, 304 in the locked position and fill any tolerance gaps between the edges of the locking fingers 338 and the edges of the apertures 328. The wedge plate 354 is similar biased into the apertures 328 by a clip type spring element 344.

Figure 35:
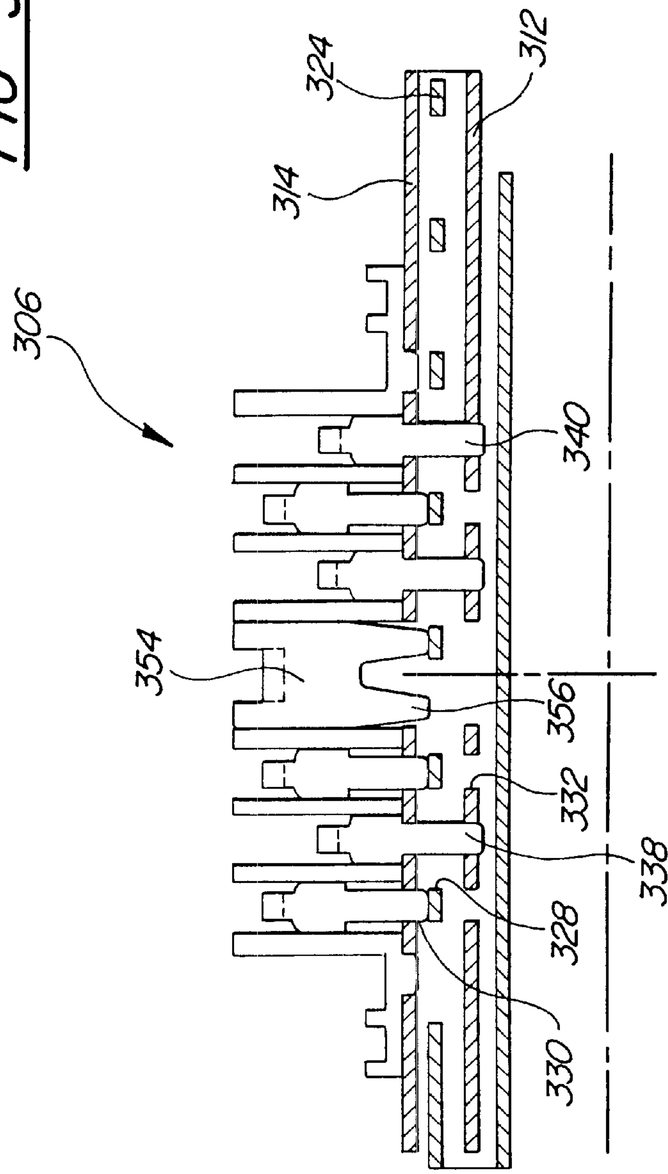
FIG. 35 is a side cross sectional view of FIG. 34.
Figure 34:
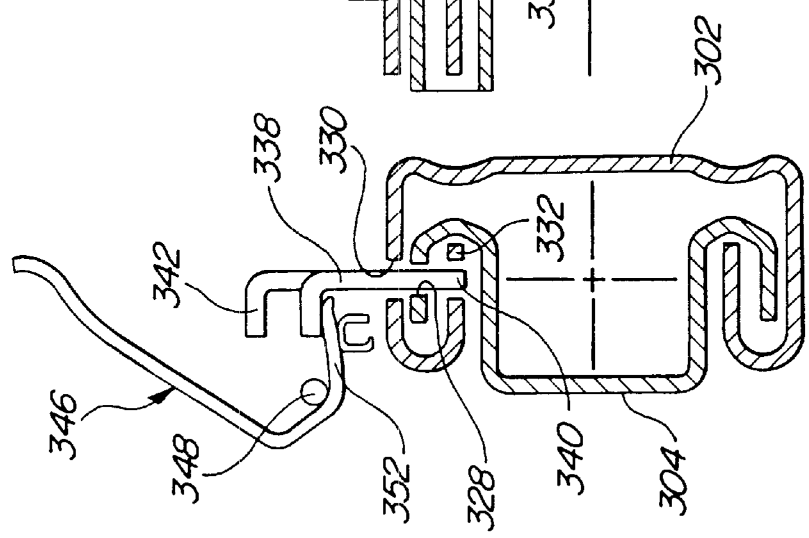
FIG. 34 is an end view of the positive engagement latch between the locked and unlocked condition.
Figure 37:
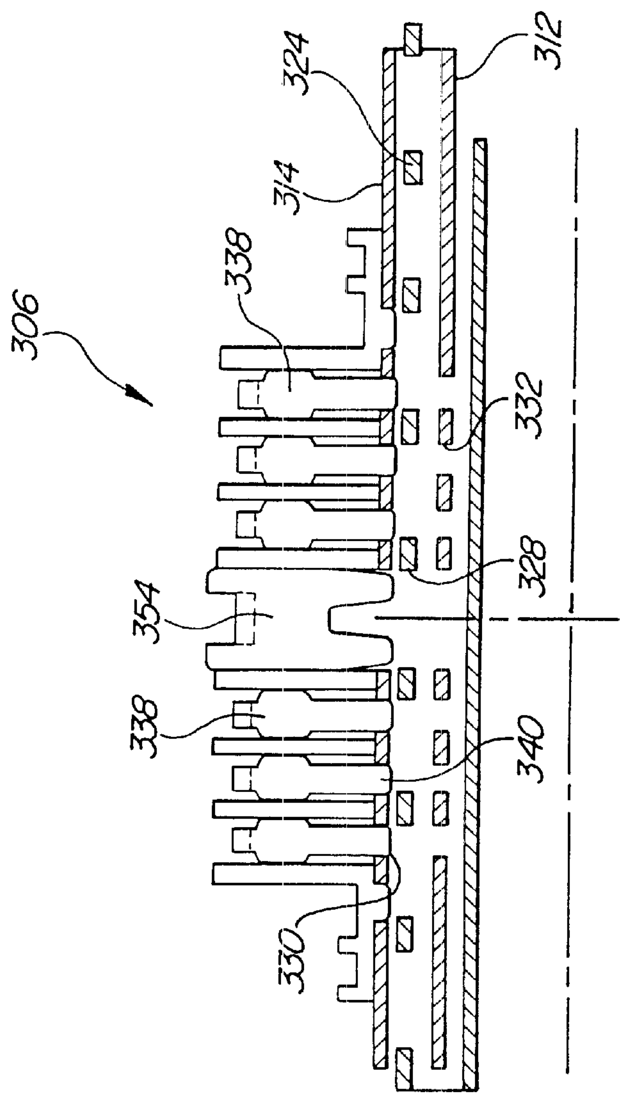
FIG. 37 is a side cross sectional view of FIG. 36.
Figure 36:
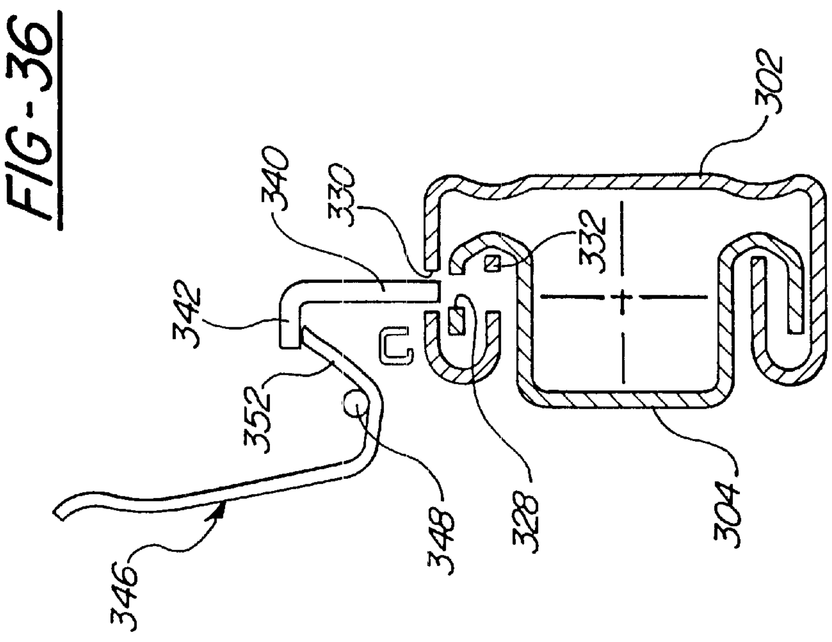
FIG. 36 is an end view of the positive engagement latch in an unlocked condition.

If the seat occupant wishes to adjust the fore and aft position of the seat assembly by releasing the seat track assembly, the actuator 346 is rotated about the pivot rod 348 against the biasing force of the spring elements 344. The cam fingers 352 engage with the cam portion 342 of the locking fingers 338 to linearly slide the fingers 338 away from the lower track 304 to remove each of the fingers 338 from the apertures 328 in the lower track 304. The fingers 338, however, may be retained and guided in the apertures 330 of the upper track 302 such that the latch 306 travels with the upper track 302 upon sliding fore and aft movement thereof relative to the lower track 304, as shown in FIGS. 36 and 37. When the actuator 346 is released to return the latch 306 to the locked condition, at least three of the six locking fingers 338 will be aligned and received within one or more of the apertures 328 in the lower track 304 and through both the apertures 330, 332 in the upper track 302 to place the fingers 338 in "double shear" engagement between the upper and lower tracks 302, 304, as shown in FIGS. 34 and 35. Thus, the latch 306 provides a positive engagement latch between the upper track 302 and lower track 304 in any position of fore and aft sliding adjustment therebetween.

The invention has been described in an illustrative manner, and it is to be understood that the terminology, which has been used, is intended to be in the nature of words of description rather than of limitation.

Many modifications and variations of the present invention are possible in light of the above teachings. It is, therefore, to be understood that within the scope of the appended claims, the invention may be practised other than as specifically described.

What is claimed is:

1. A seat track assembly for adjusting a seat assembly of an automotive vehicle comprising:

a lower track having a first plurality of apertures;

an upper track slidably mounted to said lower track and having second plurality of apertures;

a latch assembly fixedly mounted to said upper track, said latch assembly including a plurality of locking fingers projecting through said apertures in said upper track and adapted to be received in at least one of said apertures in said lower track, an actuator for moving said at least two of said fingers between a locked condition engaged with at least one of said apertures in said lower track and an unlocked condition spaced from each of said apertures in said lower track, and a biasing member for biasing said fingers to said locked condition regardless of a relative position between said upper and lower tracks;

wherein each of said apertures in said lower track has a predetermined width and predetermined space therebetween and each of said locking fingers has a predetermined width and predetermined distance between the leading edge of one locking finger and the trailing edge of an adjacent locking finger whereby said distance is less than said width of said aperture for allowing two adjacent locking fingers to be received within a single aperture in said locked condition;

said seat track assembly further including a support housing mounted to said upper track for slidably supporting and independently guiding each of said locking fingers between said locked and unlocked condition, said housing including a plurality of openings therein for slidably supporting a respective one of said locking fingers;

wherein each of said locking fingers includes a cam portion operatively engaged with said actuator and a projection portion extending through said opening in said housing for engagement with said apertures in said upper and lower tracks; and said actuator includes a base portion pivotally coupled to said support housing by a pivot rod and a plurality of cam fingers engaged with said cam portions of said locking fingers for sliding said locking fingers through said openings between said locked and unlocked condition in response to pivotal movement of said actuator about said pivot rod.

2. A seat track assembly as set forth in claim 1 wherein said locking fingers are spaced apart a predetermined distance which is greater than the predetermined space between adjacent apertures for allowing adjacent locking fingers to be received in respectively adjacent apertures in said locked condition.

3. A seat track assembly as set forth in claim 2 further including at least one spring element secured between said housing and said locking fingers for biasing said locking fingers to said locked condition selectively engaging said first and second apertures of said lower and upper tracks.

4. A seat track assembly as set forth in claim 4 wherein said cam fingers of said actuator are seated between said cam portions of said locking fingers and said support housing and biased against said housing by force of said spring elements against said cam fingers.

5. A seat track assembly as set forth in claim 4 wherein said latch assembly includes a wedge plate slidably supported by said housing and having at least one wedge finger with tapered side edges for wedging between said apertures of said upper and lower tracks to prevent relative movement therebetween in said locked condition.

6. A seat track assembly as set forth in claim 5 wherein said upper track includes a top plate supporting a pair of spaced apart side rails; each of said side rails having spaced apart and parallel inner and outer guide rails with a plurality of equally spaced apart and axially aligned apertures therethrough.

7. A seat track assembly as set forth in claim 6 wherein said lower track includes a bottom plate supporting a pair of spaced apart side rails, each of said side rails having spaced apart and parallel inner and outer guide rails wherein said outer guide rail is slidably disposed between said guide rails of said upper track.

8. A seat track assembly as set forth in claim 7 wherein said outer guide rail of said lower track includes a plurality of equally spaced apart apertures along the longitudinal length thereof which align axially with said apertures in said upper track for receiving said locking fingers in said locked condition to prevent relative sliding movement between said upper and lower tracks.

9. A seat track assembly as set forth in claim 8 wherein said locking fingers extend through each of said apertures in said guide rails of said upper track and said axially aligned aperture of said lower track in said locked condition.

* * * * *